(12) United States Patent
Chandil et al.

(10) Patent No.: US 12,700,149 B2
(45) Date of Patent: Aug. 4, 2026

(54) VECTOR GENERATIVE FILL

(71) Applicant: ADOBE INC., San Jose, CA (US)

(72) Inventors: Ashwani Chandil, Noida (IN); Vineet Batra, Delhi (IN)

(73) Assignee: ADOBE INC., San Jose, CA (US)

( * ) Notice: Subject to any disclaimer, the term of this patent is extended or adjusted under 35 U.S.C. 154(b) by 102 days.

(21) Appl. No.: 18/823,905

(22) Filed: Sep. 4, 2024

(65) Prior Publication Data

US 2026/0065542 A1     Mar. 5, 2026

(51) Int. Cl.
| | |
|---|---|
| *G06T 11/40* | (2006.01) |
| *G06T 5/60* | (2024.01) |
| *G06T 5/70* | (2024.01) |
| *G06T 7/11* | (2017.01) |
| *G06T 7/194* | (2017.01) |

(52) U.S. Cl.
CPC ............... *G06T 11/40* (2013.01); *G06T 5/60* (2024.01); *G06T 5/70* (2024.01); *G06T 7/11* (2017.01); *G06T 7/194* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

2021/0248432 A1* 8/2021 Wang ................. G06K 15/1836

OTHER PUBLICATIONS

Aggarwal, et al., "Controlled and Conditional Text to Image Generation with Diffusion Prior", arXiv preprint arXiv:2302.11710v2 [cs.CV] Aug. 1, 2023, 23 pages.
Couairon, et al., "Diffedit: Diffusion-Based Semantic Image Editing With Mask Guidance", arXiv preprint arXiv:2210.11427v1 [cs.CV] Oct. 20, 2022, pp. 1-21.
Meng, et al., "Sdedit: Guided Image Synthesis and Editing With Stochastic Differential Equations", arXiv preprint arXiv:2108.01073v2 [cs.CV] Jan. 5, 2022, pp. 1-33.
Ronneberger, et al., "U-Net: Convolutional Networks for Biomedical Image Segmentation", In Medical image computing and computer-assisted intervention—MICCAI 2015: 18th international conference, Munich, Germany, Oct. 5-9, 2015, proceedings, part III 18, Springer International Publishing, DOI: 10.1007/978-3-319-24574-4_28, pp. 234-241.
Song, et al., "Denoising Diffusion Implicit Models", Published as a conference paper at ICLR, arXiv preprint arXiv:2010.02502v4 [cs.LG] Oct. 5, 2022, pp. 1-22.

* cited by examiner

*Primary Examiner* — Robert J Craddock
(74) *Attorney, Agent, or Firm* — F. CHAU & ASSOCIATES, LLC

(57) ABSTRACT

A method, apparatus, non-transitory computer readable medium, and system for image processing include obtaining an outline image and an input prompt, where the outline image includes an outline of a region and the input prompt indicates content for the region, generating a mask based on the outline image, where the mask indicates the region within the outline, generating a preliminary image based on the mask, where the preliminary image includes noise in the region indicated by the outline, and generating a synthetic image based on the input prompt, the mask, and the preliminary image, where the synthetic image depicts the content in the region indicated by the outline. A vectorized image is generated based on the synthetic image.

20 Claims, 13 Drawing Sheets

Figure 2:
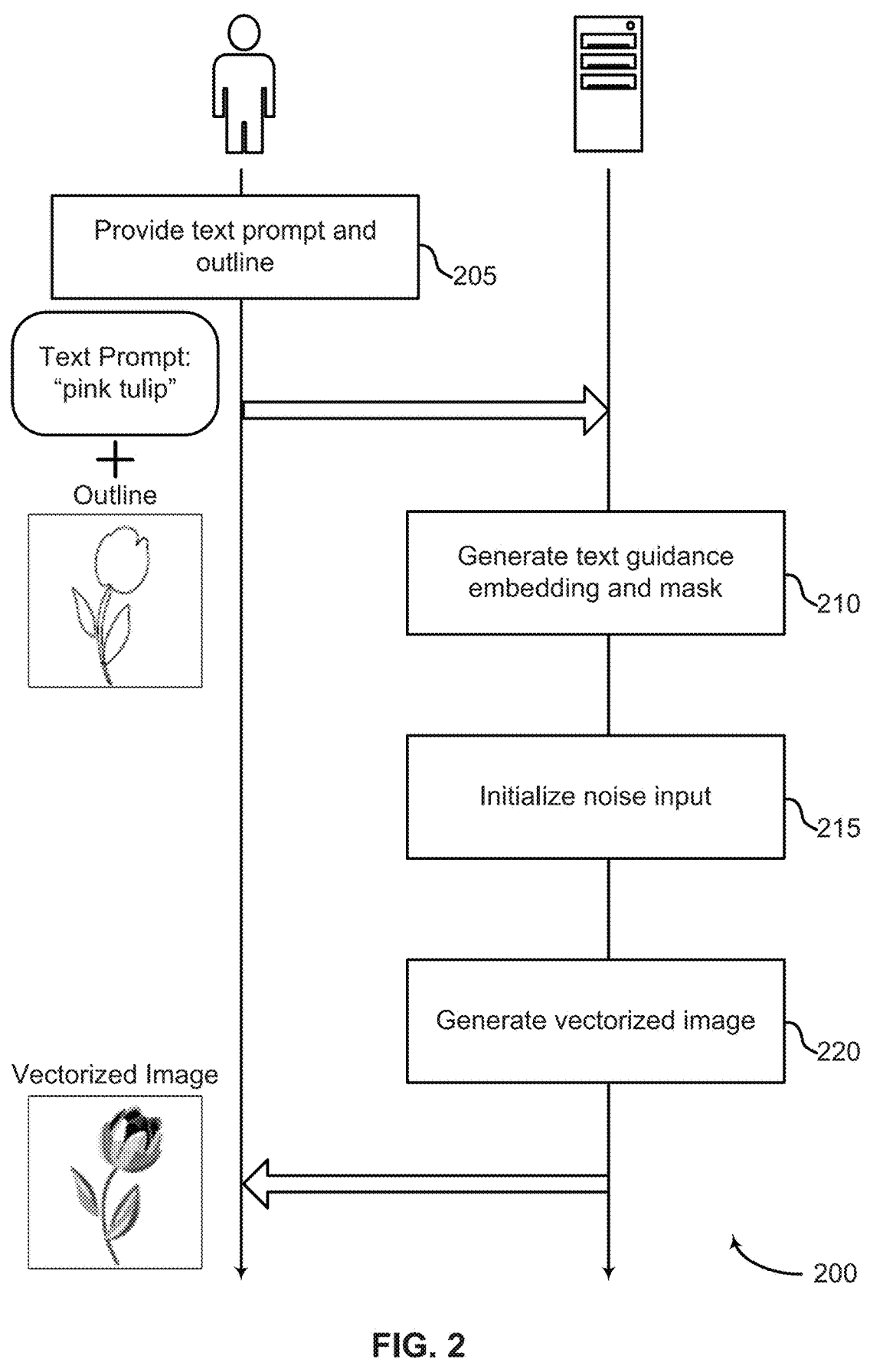

Provide text prompt and outline ~205

Text Prompt: "pink tulip"

\+

Outline

Generate text guidance embedding and mask ~210

Initialize noise input ~215

Generate vectorized image ~220

Vectorized Image

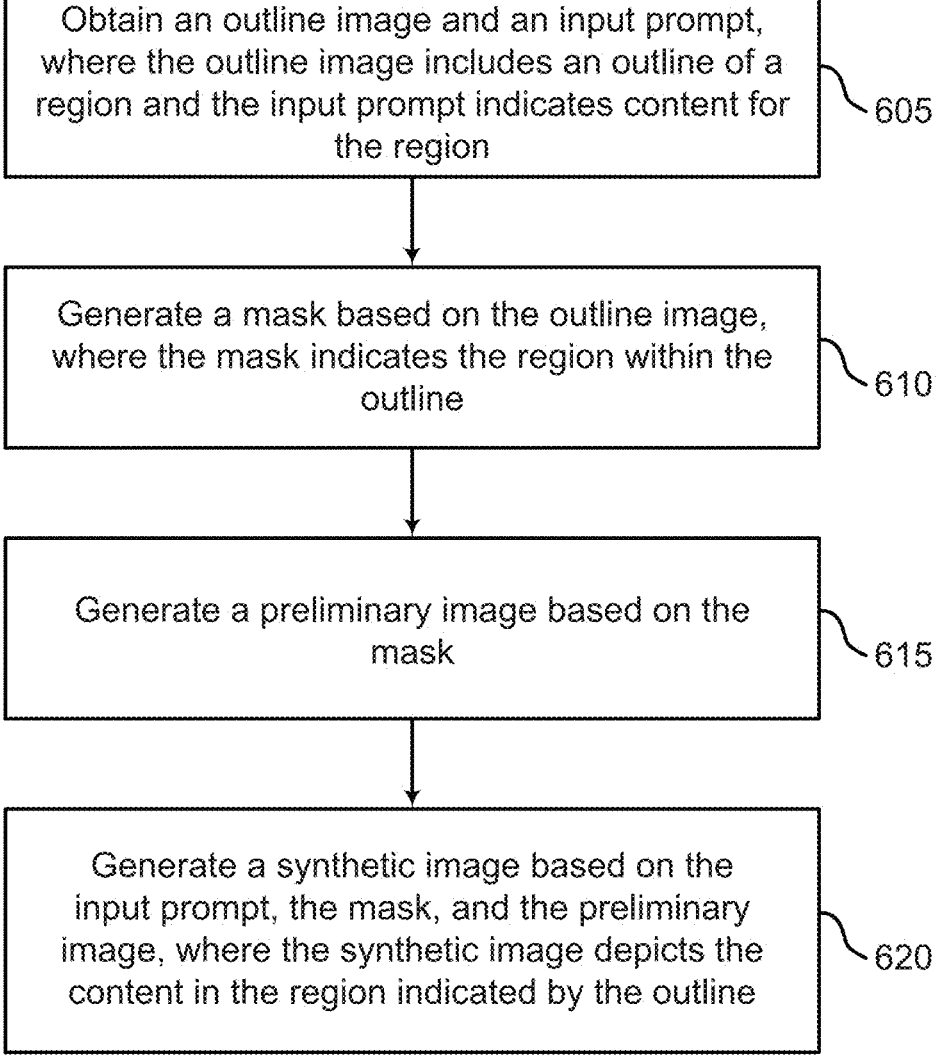

Obtain an outline image and an input prompt, where the outline image includes an outline of a region and the input prompt indicates content for the region

605

Generate a mask based on the outline image, where the mask indicates the region within the outline

610

Generate a preliminary image based on the mask

615

Generate a synthetic image based on the input prompt, the mask, and the preliminary image, where the synthetic image depicts the content in the region indicated by the outline

VECTOR GENERATIVE FILL

BACKGROUND

The following relates generally to image processing, and more specifically to vector image generation using a machine learning model. Image processing refers to the use of a computer to edit an image using an algorithm or a processing network. In some cases, image processing software can be used for various image processing tasks, such as image restoration, image detection, image editing, image compositing, and image generation. For example, image generation includes the use of a machine learning model to generate a synthetic image based on a conditioning.

In some cases, the machine learning model generates a vectorized image based on a text, a color, or a shape outline. Unlike raster images, vectorized images include paths having points, lines, curves, and shapes that can be scaled infinitely without compromising the image quality. In some cases, vectorized images can be used for graphic design, digital illustration, typography, or web graphics due to the scalability and relatively small size file.

SUMMARY

Aspects of the present disclosure provide a method and a system for image generation. In one aspect, the system receives a text prompt describing an image content and an outline indicating a region to generate a synthetic image depicting the content within the region. According to some aspects, the system includes a mask component configured to generate a mask based on the outline. The mask component is further configured to generate an initial image (or a preliminary image) for an image generation model. The image generation model receives the initial image to initiate the image generation process, uses the text prompt as text conditioning, and uses the mask as guidance to generate the synthetic image.

A method, apparatus, non-transitory computer readable medium, and system for image processing include obtaining an outline image and an input prompt, wherein the outline image includes an outline of a region and the input prompt indicates content for the region; generating a mask based on the outline image, wherein the mask indicates the region within the outline; generating a preliminary image based on the mask, wherein the preliminary image includes noise in the region indicated by the outline; generating, using an image generation model, a synthetic image based on the input prompt, the mask, and the preliminary image, wherein the synthetic image depicts the content in the region indicated by the outline; and generating a vectorized image based on the synthetic image.

A method, apparatus, non-transitory computer readable medium, and system for image processing include obtaining an outline image and an input prompt, generating a mask based on the outline image, generating a preliminary image based on the mask, adding additional noise to the preliminary image to obtain a noise input, generating a synthetic image based on the input prompt, the mask, the preliminary image, and the noise input, and generating a vectorized image based on the synthetic image.

An apparatus and system for image processing include at least one processor, at least one memory storing instructions executable by the at least one processor, a mask component comprising parameters stored in the at least one memory and configured to generate a mask based on an outline image and to generate a preliminary image based on the mask, where the outline image includes an outline of a region, where the mask indicates the region within the outline, and where the preliminary image includes noise in the region indicated by the outline, and an image generation model comprising parameters stored in the at least one memory and configured to generate a synthetic image based on an input prompt, the mask, and the preliminary image, where the input prompt indicates content for the region and the synthetic image depicts the content in the region indicated by the outline.

BRIEF DESCRIPTION OF THE DRAWINGS

FIG. 2 shows an example of a method for generating vectorized image according to aspects of the present disclosure.

FIG. 6 shows an example of a method for mask-guided image generation according to aspects of the present disclosure.

DETAILED DESCRIPTION

Figure 1:
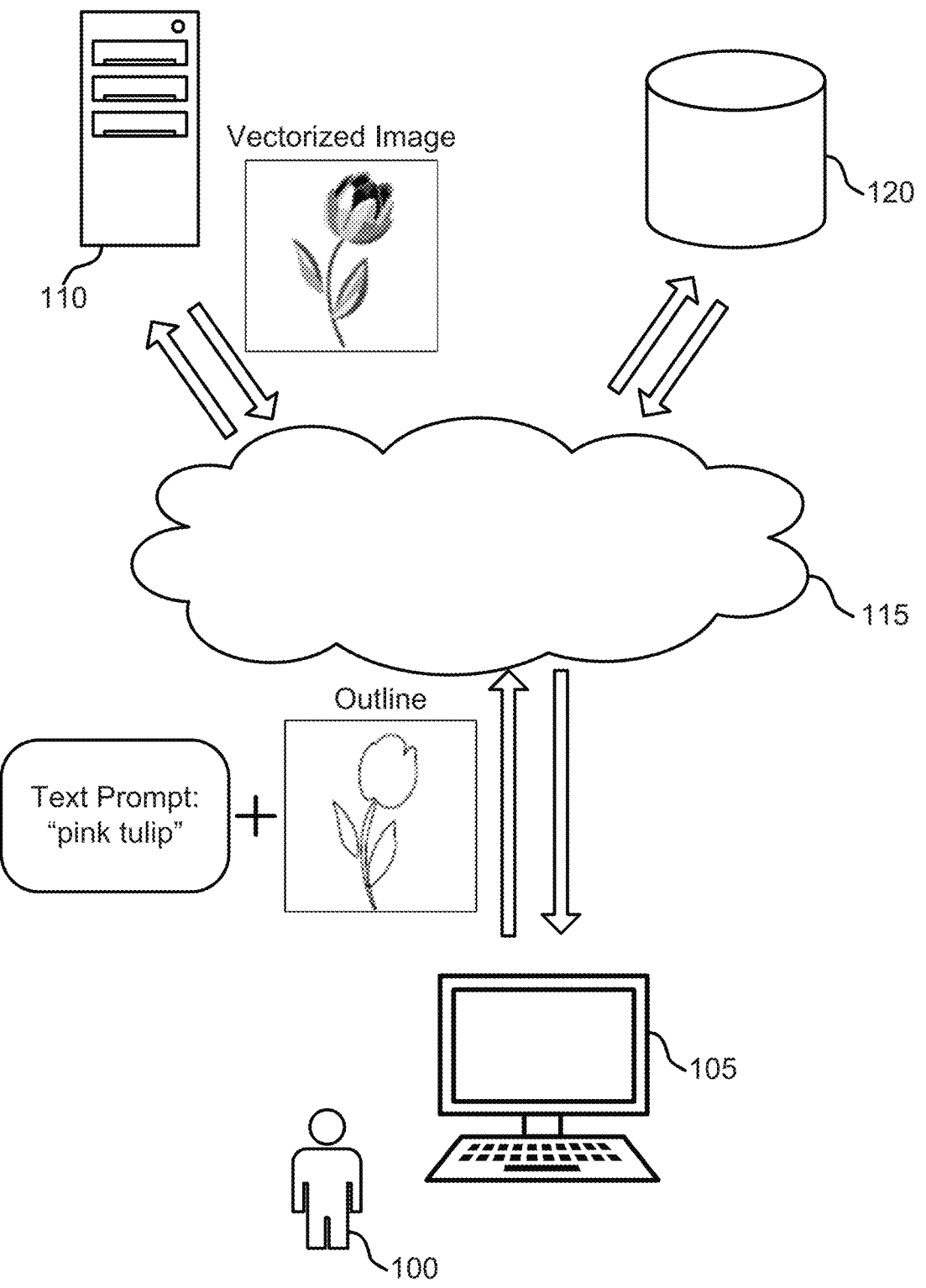
FIG. 1 shows an example of an image processing system according to aspects of the present disclosure.

Aspects of the present disclosure relate to vector image generation using generative machine learning. Some embodiments of the disclosure relate to an image generation system that accurately generates vectorized images showing image content depicted within an outline. In one aspect, the system includes an image generation model configured to generate a synthetic image based on a mask of the input outline image. By guiding the image generation process using the mask, the image generation model ensures that image contents are accurately generated within the outlined region, thus minimizing the generation of artifacts.

According to some embodiments, the system generates a synthetic image depicting image content within a region based on a text prompt describing the image content and an outline indicating the region. According to some aspects, the system includes a mask component configured to generate a mask based on the outline. The mask component is further configured to generate a preliminary image (i.e., a noise mask) for an image generation model. The image generation model receives the initial image to initiate the image generation process. In one aspect, the image generation model uses the text prompt as text conditioning. In one aspect, the image generation model uses the mask as guidance to generate the synthetic image.

A subfield of image processing relates to vector image generation. In some cases, image processing systems including a machine learning model are used to generate vector images based on an outline provided, for example, by a user. In some cases, applying content to the outline may be difficult and time-consuming. For example, vector image generation involves color selection and effectively filling the selected colors to one or more regions within the outline.

Conventional image processing systems for vector image generation rely heavily on manual processes. For example, some systems require additional inputs of vector paths within the outline and color inputs. However, the vector image generation process may be time-consuming and computationally expensive. In some cases, a user would require a significant skill set to operate the systems. As a result, these systems may be suboptimal for general use.

Some image processing systems attempt to generate vector contents by inpainting pixels within the region indicated by the outline. For example, these systems use a black-and-white mask to fill regions within the outline. However, these systems are configured to generate raster images instead of to generate vector-like image contents. Some systems inpaint pixels within the outlined region by conditioning the model with a text prompt. However, these systems are unable to generate vector-like image contents.

Some image processing systems are conditioned on various spatial context inputs to generate vector contents. For example, the various spatial contexts include depth maps, segmentation maps, scribbles, or canny outlines. However, by conditioning the system with the spatial contexts, additional specific training for each input conditioning may be required. As a result, the computational cost of training these systems may be increased.

Embodiments of the disclosure improve on conventional image generation models by generating vectorized images more accurately and efficiently. This is achieved using a system that includes a mask component, an image generation model, and a vectorization component. For example, the mask component is configured to generate a mask based on the input outline image. The mask is provided to the image generation model to guide the image generation process ensuring that vector-like image contents are generated within the outlined region. Then, the vectorization component can easily generate a vectorized image based on the synthetic image generated by the image generation model.

In one aspect, the mask component is configured to generate a mask based on the input outline image. The mask includes a region within the outline for the content to be generated. The mask component further generates an initial image (or a preliminary image) used to initiate the image generation process. In one aspect, the image generation model is configured to generate a synthetic image depicting vector-like content based on a text prompt describing the content, the mask, and the preliminary image. In some cases, the synthetic image is generated based on an augmented text prompt. In one aspect, the vectorization component is configured to generate a vectorized image based on the synthetic image. In some cases, the background of the vectorized image is removed.

Figure 12:
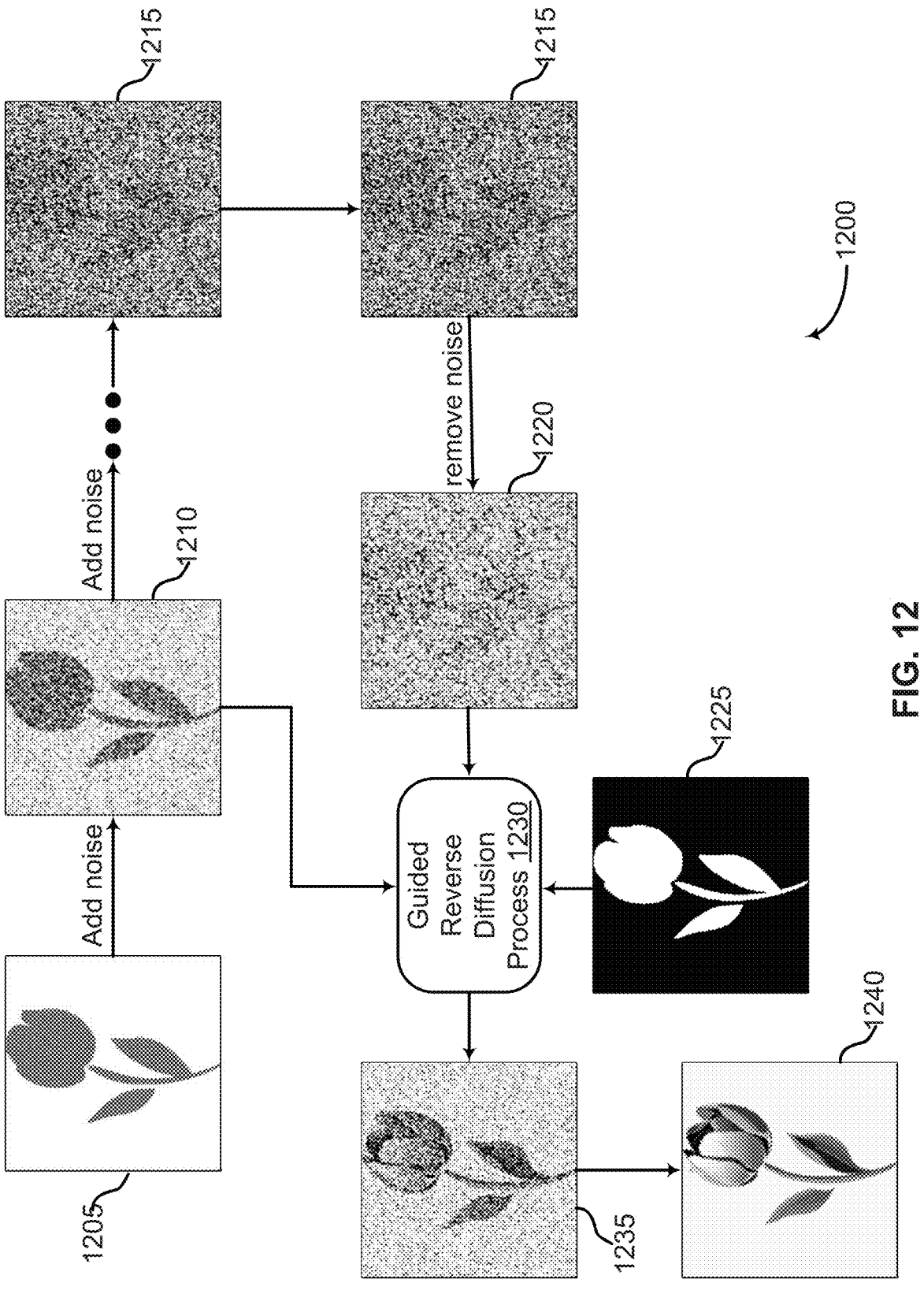
FIG. 12 shows an example of a mask-guided diffusion process according to aspects of the present disclosure.
Figure 13:
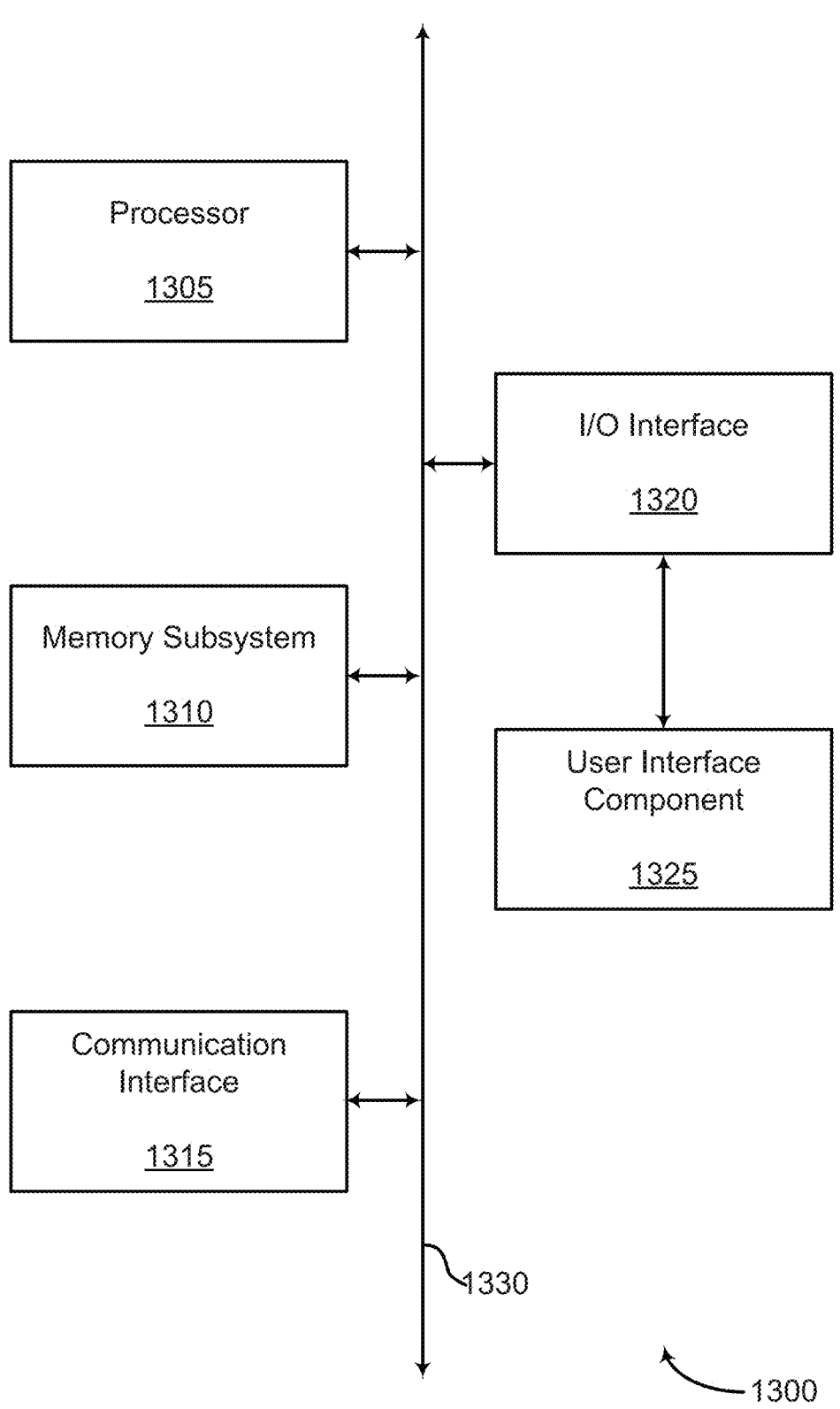
FIG. 13 shows an example of a computing device according to aspects of the present disclosure.

An example system of the inventive concept in image processing is provided with reference to FIGS. 1 and 13. An example application of the inventive concept in image processing is provided with reference to FIGS. 2-5. Details regarding the architecture of an image processing apparatus are provided with reference to FIGS. 7-10. An example of a process for image processing is provided with reference to FIGS. 6 and 11-12.

Accordingly, the present disclosure provides systems and methods that improve on conventional image generation models by more accurately and efficiently generating vector images. For example, the system includes a mask component configured to generate a mask and a preliminary image based on the outline. By using the preliminary image to initiate the image generation process and using the mask to guide the image generation process, the system is able to generate accurate image content within the region indicated by the outline. In some cases, an augmented prompt is generated based on the text prompt. By guiding the image generation process using the augmented prompt, the system can generate vector-like image content within the outlined region in the synthetic image. In one aspect, the vectorization component can efficiently generate vectorized image based on the synthetic image having vector-like image content.

Vector Image Generation

In FIGS. 1-6, and 11-12, a method, apparatus, non-transitory computer readable medium, and system for image processing include obtaining an outline image and an input prompt, where the outline image includes an outline of a region and the input prompt indicates content for the region, generating a mask based on the outline image, where the mask indicates the region within the outline, generating a preliminary image based on the mask, where the preliminary image includes noise in the region indicated by the outline, and generating, using an image generation model, a synthetic image based on the input prompt, the mask, and the preliminary image, where the synthetic image depicts the content in the region indicated by the outline.

Some examples of the method, apparatus, non-transitory computer readable medium, and system further include labeling each pixel of the mask based on whether the pixel is located within the outline. Some examples of the method, apparatus, non-transitory computer readable medium, and system further include adding noise to the region within the outline. Some examples of the method, apparatus, non-transitory computer readable medium, and system further include adding additional noise to the preliminary image to obtain a noise input. Some examples further include denoising the noise input based on the preliminary image to generate the synthetic image.

Some examples of the method, apparatus, non-transitory computer readable medium, and system further include obtaining an outline strength parameter. Some examples further include performing a number of diffusion steps based on the outline strength parameter. Some examples of the method, apparatus, non-transitory computer readable medium, and system further include encoding the input prompt to obtain a text embedding, where the synthetic image is generated based on the text embedding.

Some examples of the method, apparatus, non-transitory computer readable medium, and system further include obtaining a reference style, where the synthetic image is generated based on the reference style. Some examples of the method, apparatus, non-transitory computer readable medium, and system further include generating a vectorized image based on the synthetic image. Some examples of the method, apparatus, non-transitory computer readable medium, and system further include removing a background region of the vectorized image.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 7.

Referring to FIG. 1, user 100 provides a text prompt and an outline to image processing apparatus 110 via user device 105 and cloud 115 to generate a vectorized image. In some cases, the text prompt may be a general description of the content to be generated in the vectorized image. For example, the text prompt states "pink tulip?" For example, the outline depicts the shape of the tulip. In some embodiments, image processing apparatus 110 includes a machine learning model that generates a text embedding based on the text prompt. In some cases, the machine learning model generates a mask and a preliminary image based on the outline. The machine learning model generates a vectorized image based on the text embedding, the mask, and the preliminary image. For example, the vectorized image depicts a pink tulip within the region indicated by the outline. Image processing apparatus 110 displays the vectorized image to user 100 via user device 105 and cloud 115.

User device 105 may be a personal computer, laptop computer, mainframe computer, palmtop computer, personal assistant, mobile device, or any other suitable processing apparatus. In some examples, user device 105 includes software that incorporates an image processing application. In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may be a graphical user interface (GUI). In some examples, a user interface may be represented in code in which the code is sent to the user device 105 and rendered locally by a browser. The process of using the image processing apparatus 110 is further described with reference to FIG. 2.

Image processing apparatus 110 is an example of, or includes aspects of, the corresponding element described with reference to FIG. 7. According to some aspects, image processing apparatus 110 includes a computer implemented network comprising a machine learning model, mask component, a text encoder, an image generation model, and a vectorization component. Image processing apparatus 110 further includes a processor unit, a memory unit, and an I/O module. In some embodiments, image processing apparatus 110 further includes a communication interface, user interface components, and a bus as described with reference to FIG. 13. Additionally or alternatively, image processing apparatus 110 communicates with user device 105 and database 120 via cloud 115. Further detail regarding the operation of image processing apparatus 110 is described with reference to FIG. 2.

In some cases, image processing apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

According to some aspects, database 120 stores training data. Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

FIG. 2 shows an example of a method 200 for generating a vectorized image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, a user (e.g., the user described with reference to FIG. 1) provides a text prompt (also referred to as the input prompt) and an outline (also referred to as the outline image) to the image processing apparatus (e.g., the image processing apparatus described with reference to FIGS. 1 and 7). For example, the text prompt states "pink tulip" and the outline depicts the shape of the tulip. In some aspects, the image processing apparatus includes a mask component configured to generate a mask based on the outline. In some embodiments, the mask component generates a preliminary image based on the mask. In some aspects, a text encoder is configured to generate a text embedding based on the text prompt.

In some aspects, the image processing apparatus includes an image generation model that takes the text embedding, the mask, and the preliminary image as inputs to generate a synthetic image that depicts the pink tulip described by the text prompt within the tulip shape indicated by the outline. In some aspects, the image processing apparatus includes a vectorization component that converts the synthetic image to a vectorized image. The vectorized image is displayed to the user via the image processing apparatus.

At operation 205, the system provides a text prompt and an outline. In some cases, the operations of this step refer to, or may be performed by, a user as described with reference to FIG. 1. In some cases, the user provides a text prompt describing content to be generated in a generated image (e.g., the vectorized image). For example, a user may provide the prompt "pink tulip". In some cases, the user provides an outline depicting the shape of the content to be generated in the generated image. For example, the outline may be a user scribble. For example, the outline may be computer-generated based on a text description. In some examples, guidance can be provided in a form other than text, such as via an image, a sketch, or a layout.

At operation 210, the system generates a text guidance embedding and a mask. In some cases, the operations of this step refer to, or may be performed by, an image processing apparatus as described with reference to FIGS. 1 and 7. In some cases, the operations of this step refer to, or may be performed by, a text encoder as described with reference to FIGS. 7-9. In some cases, the operations of this step refer to, or may be performed by, a mask component as described with reference to FIGS. 7 and 8. In some cases, the system converts the inputs into conditional guidance vectors or other multi-dimensional representations. For example, the text prompt may be encoded into a text embedding (e.g., a vector) or a series of vectors using a text encoder, a transformer model, or a multi-modal encoder. In some cases, the text encoder for generating the text embedding is trained independently of the image generation model.

In some cases, the outline is converted into a mask using a mask component. For example, the mask is used as guidance to guide the image generation process of the image generation model. In some cases, a preliminary image is generated based on the outline. In some embodiments, the preliminary image is used to initiate the image generation process. Further detail on the mask component is described with reference to FIGS. 7, 8, and 12. Further detail on the image generation process is described with reference to FIG. 12.

At operation 215, the system initializes noise input. In some cases, the operations of this step refer to, or may be performed by, an image processing apparatus as described with reference to FIGS. 1 and 7. In some cases, the operations of this step refer to, or may be performed by, an image generation model as described with reference to FIGS. 7 and 8. In some cases, the noise input including random noise is initialized. The noise input may be in a pixel space or a latent space. In some embodiments, the noise input is added to the mask to generate the preliminary image. By initializing the image generation model with random noise, different variations of a synthetic image including the content described by the text conditioning (e.g., the text prompt) can be generated.

At operation 220, the system generates a vectorized image. In some cases, the operations of this step refer to, or may be performed by, an image processing apparatus as described with reference to FIGS. 1 and 7. In some cases, the operations of this step refer to, or may be performed by, a vectorization component as described with reference to FIGS. 7 and 8. For example, the system generates a synthetic image based on the text embedding, the mask, and the preliminary image. For example, the synthetic image may be generated using a reverse diffusion process as described with reference to FIGS. 8 and 11-12. In some cases, the vectorization component converts the synthetic image into the vectorized image. Then, the vectorized image is returned and displayed to the user via a user interface provided by the image processing apparatus on the user device.

Figure 3:
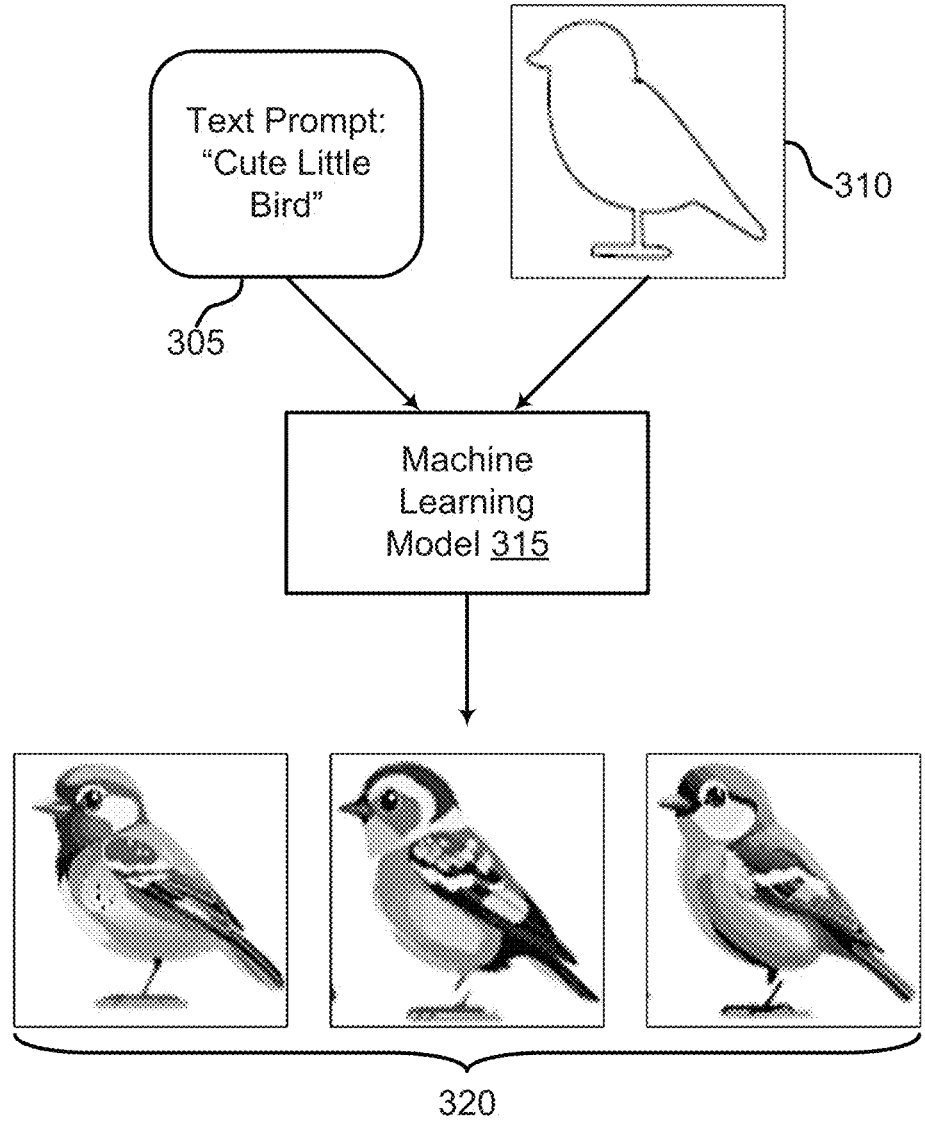
FIG. 3 shows an example of vector image generation according to aspects of the present disclosure.

FIG. 3 shows an example of vector image generation according to aspects of the present disclosure. The example shown includes image generation system 300, text prompt 305, outline 310, machine learning model 315, and vectorized image 320. In some cases, image generation system 300 is implemented in a user interface.

Referring to FIG. 3, machine learning model 315 receives text prompt 305 and outline 310 to generate vectorized image 320. For example, text prompt 305 (sometimes referred to as input prompt) states "cute little bird". For example, outline 310 (sometimes referred to as outline image) depicts the shape of a bird. In some cases, an augmented prompt is obtained based on text prompt 305. In some cases, outline 310 includes an enclosed region for the content to be generated within the enclosed region. In some aspects, machine learning model 315 includes a text encoder configured to generate a text embedding based on text prompt 305. In some embodiments, the text encoder generates a text embedding based on the augmented prompt.

In some aspects, machine learning model 315 includes a mask component configured to generate a mask and a preliminary image based on outline 310. In some aspects, machine learning model 315 includes an image generation model configured to generate a synthetic image depicting vector-like contents described by text prompt 305 within the region indicated by outline 310. The synthetic image is converted into vectorized image 320 using a vectorization component. In some cases, for example, vectorized image 320 includes different variations of the bird.

Image generation system 300 is an example of, or includes aspects of, the corresponding element described with reference to FIGS. 4 and 5. Text prompt 305 is an example of, or includes aspects of, the corresponding element described with reference to FIGS. 4, 5, 8, and 9. Outline 310 is an example of, or includes aspects of, the corresponding element described with reference to FIGS. 4, 5, and 8.

Machine learning model 315 is an example of, or includes aspects of, the corresponding element described with reference to FIGS. 4, 5, and 8. Vectorized image 320 is an example of, or includes aspects of, the corresponding element described with reference to FIGS. 4, 5, and 8.

Figure 4:
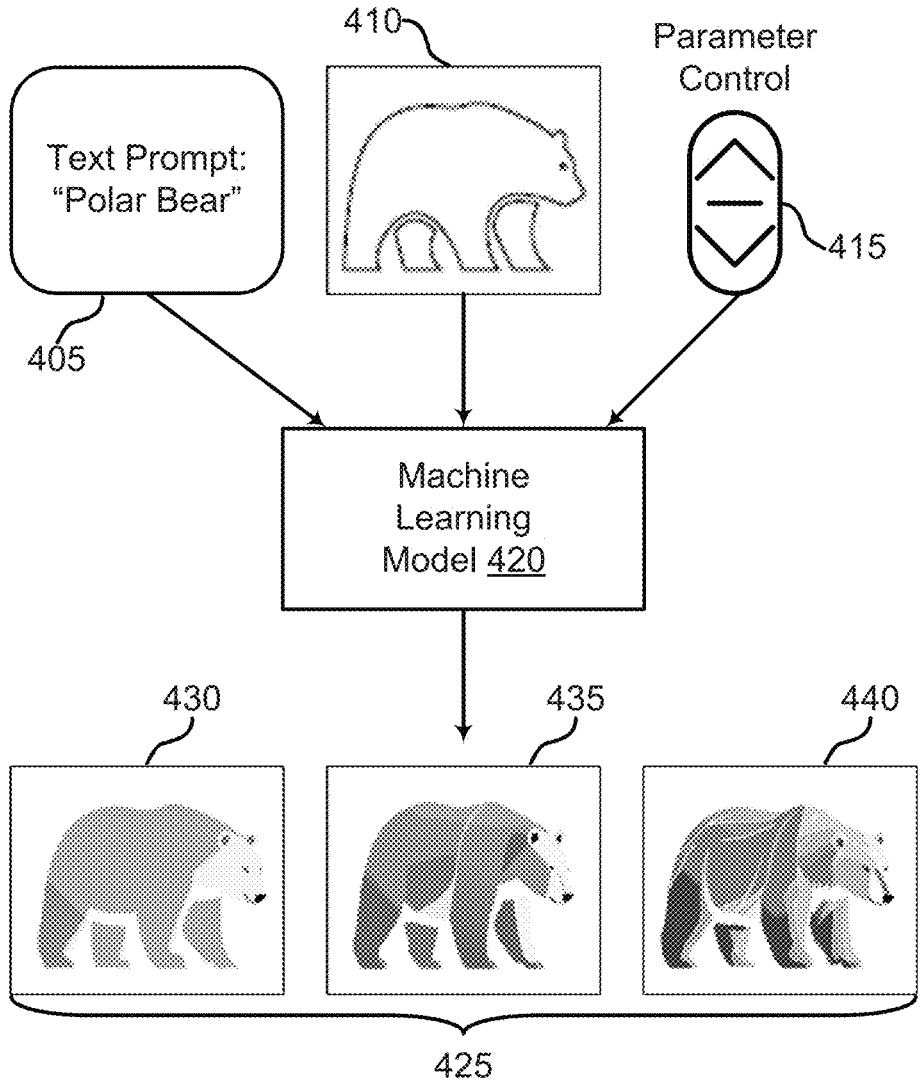
FIG. 4 shows an example of vector image generation using parameter control according to aspects of the present disclosure.

FIG. 4 shows an example of vector image generation using parameter control according to aspects of the present disclosure. The example shown includes image generation system 400, text prompt 405, outline 410, parameter control element 415, machine learning model 420, and vectorized image 425. In one aspect, vectorized image 425 includes first image 430, second image 435, and third image 440. In some cases, image generation system 400 is implemented in a user interface.

Referring to FIG. 4, machine learning model 420 receives text prompt 405 and outline 410 to generate vectorized image 425. For example, text prompt 405 states "polar bear" and outline 410 depicts the shape of a polar bear. In some embodiments, parameter control element 415 is used to control the fidelity of vectorized image 425. In some cases, parameter control element 415 includes a slider that controls and adjusts the output of the image generation model. For example, parameter control element 415 includes an outline strength parameter and the masking interval parameter used to adjust and control the faithfulness of the generated vector graphics to the outline. In some cases, by adjusting the parameters, machine learning model 420 can generate low-fidelity synthetic images and high-fidelity synthetic images.

In some embodiments, parameter control element 415 includes a style prompt parameter and a style strength parameter used to adjust and control the complexity (or detail) of the generated vector graphics. For example, the parameters adjust a level of detail in the output aligning with the user preference. In some cases, parameter control element 415 is implemented in a user control element such as a slider.

In some cases, for example, machine learning model 420 generates vectorized image 425 including first image 430, second image 435, and third image 440. As shown in FIG. 4, first image 430 is a low-fidelity image that has little detail. For example, first image 430 has fewer vector points, vector lines, and vector curves. In addition, first image 430 has few variations of colors within the region indicated by outline 410. Second image 435 is a mid-fidelity image that has more detail than first image 430. In addition, second image 435 has more vector points, vector lines, vector curves, and color variations within the region indicated by outline 410 than first image 430. For example, third image 440 is a high-fidelity image that has the most detail among vectorized image 425. For example, third image 440 has the most detail including vector points, vector lines, vector curves, and color variations within the region indicated by outline 410.

Image generation system 400 is an example of, or includes aspects of, the corresponding element described with reference to FIGS. 3 and 5. Text prompt 405 is an example of, or includes aspects of, the corresponding element described with reference to FIGS. 3, 5, 8, and 9. Outline 410 is an example of, or includes aspects of, the corresponding element described with reference to FIGS. 3, 5, and 8.

Machine learning model 420 is an example of, or includes aspects of, the corresponding element described with reference to FIGS. 3, 5, and 8. Vectorized image 425 is an example of, or includes aspects of, the corresponding element described with reference to FIGS. 3, 5, and 8.

Figure 5:
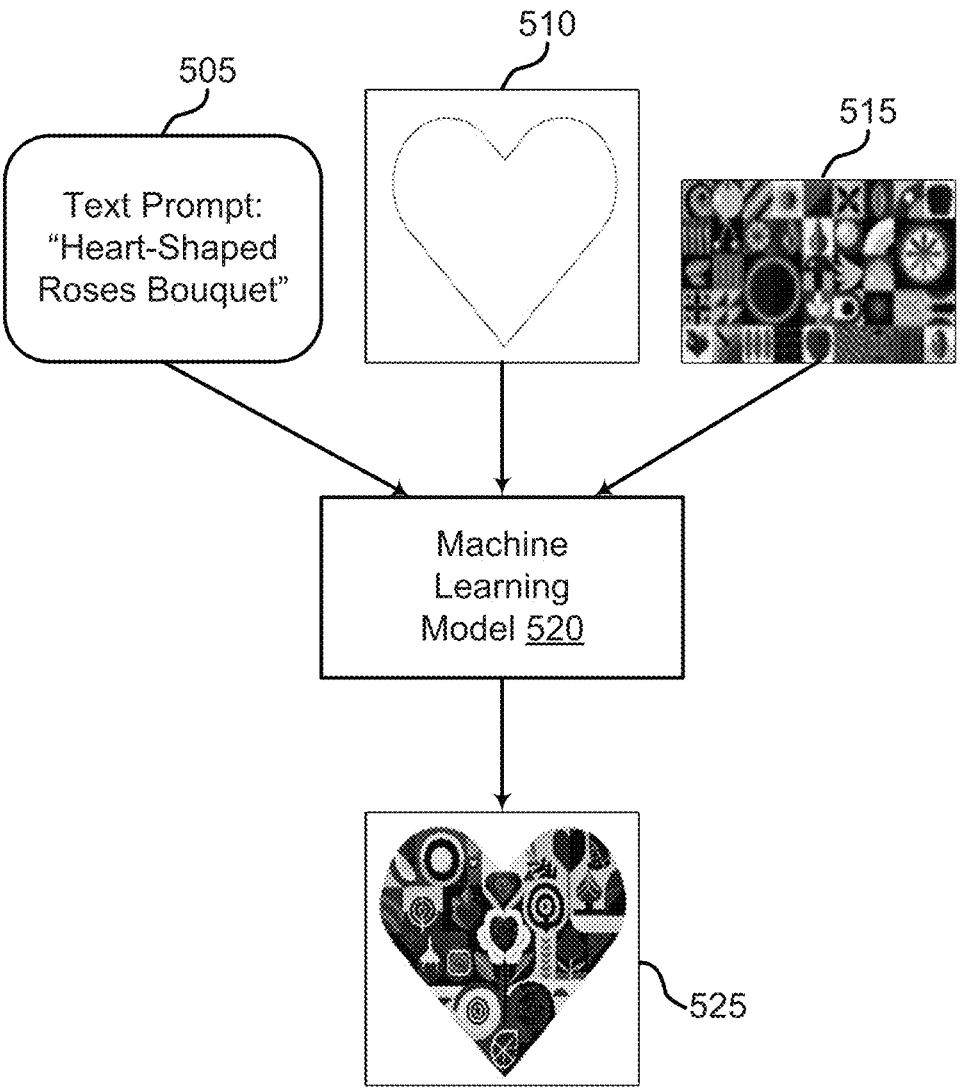
FIG. 5 shows an example of vector image generation using style control according to aspects of the present disclosure.

FIG. 5 shows an example of vector image generation using style control according to aspects of the present disclosure. The example shown includes image generation system 500, text prompt 505, outline 510, style input 515, machine learning model 520, and vectorized image 525. In some cases, image generation system 500 is implemented in a user interface.

Referring to FIG. 5, machine learning model 520 receives text prompt 505, outline 510, and style input 515 to generate vectorized image 525. For example, text prompt 505 states "heart-shaped roses bouquet" and outline 510 depicts the shape of a heart. In some cases, style input 515 is an image depicting an image style. For example, style input 515 depicts a grid-like image with different shapes, different patterns, and various colors.

In some embodiments, a style transfer control parameter transfers the image style from a reference image (e.g., style input 515) to the generated vector graphics (e.g., vectorized image 525). In some cases, the style transfer control parameter is implemented in machine learning model 520. In some cases, for example, the style transfer control parameter is implemented in a parameter control element described with reference to FIG. 4. For example, an image embedding is generated based on style input 515, where the image embedding includes information about the image style depicted in style input 515. In some cases, the image embedding is used as style embedding to guide the image generation process.

Accordingly, vectorized image 525 depicts an image style that resembles the style from the style input 515.

Image generation system 500 is an example of, or includes aspects of, the corresponding element described with reference to FIGS. 3 and 4. Text prompt 505 is an example of, or includes aspects of, the corresponding element described with reference to FIGS. 3, 4, 8, and 9. Outline 510 is an example of, or includes aspects of, the corresponding element described with reference to FIGS. 3, 4, and 8.

Machine learning model 520 is an example of, or includes aspects of, the corresponding element described with reference to FIGS. 3, 4, and 8. Vectorized image 525 is an example of, or includes aspects of, the corresponding element described with reference to FIGS. 3, 4, and 8.

FIG. 6 shows an example of a method 600 for mask-guided image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system obtains an outline image and an input prompt, where the outline image includes an outline of a region and the input prompt indicates content for the region. In some cases, the operations of this step refer to, or may be performed by, an image generation model as described with reference to FIGS. 7 and 8. In some cases, the outline image depicts a shape of the object or entity to be generated in the output image (e.g., the synthetic image or the vectorized image). In some cases, the outline image includes an enclosed region for the content to be generated. In some cases, the input prompt describes the content to be generated in the region indicated by the outline. In some cases, the input prompt may be a text prompt, a voice prompt, an image prompt, a video prompt, or a combination thereof. In some cases, the outline image may be obtained from a user scribble. In some cases, a machine learning model converts the user scribble to the outline image. In some cases, the outline image is generated based on a text description, a voice description, or a combination thereof.

At operation 610, the system generates a mask based on the outline image, where the mask indicates the region within the outline. In some cases, the operations of this step refer to, or may be performed by, a mask component as described with reference to FIGS. 7 and 8. For example, the mask includes a binary black-and-white image depicting the shape. For example, the enclosed region indicated by the outline may be labeled with 1s and the remaining outer region (or a background region) may be labeled with 0s.

At operation 615, the system generates a preliminary image based on the mask, where the preliminary image includes noise in the region indicated by the outline. In some cases, the operations of this step refer to, or may be performed by, a mask component as described with reference to FIGS. 7 and 8. In some cases, a noise map including random noise is combined with the mask to generate the preliminary image. In some cases, the preliminary image is used to initiate the image generation process.

At operation 620, the system generates, using an image generation model, a synthetic image based on the input prompt, the mask, and the preliminary image, where the synthetic image depicts the content in the region indicated by the outline. In some cases, the operations of this step refer to, or may be performed by, an image generation model as described with reference to FIGS. 7 and 8. In some cases, the synthetic image includes vector-like contents. In some cases, the synthetic image includes additional vector points, vector lines, and vector curves within the region indicated by the outline. In some cases, the synthetic image is a raster image, where each pixel of the synthetic image has a corresponding color value (e.g., an RGB value). In some cases, the raster image depicts high-quality details and complex color gradients.

In some embodiments, the synthetic image is converted into a vectorized image. For example, the vectorized image includes vector paths, vector shapes, and color variations. In some aspects, the vectorized image can be scaled infinitely without a loss of the image quality. In some cases, the vectorized image has a smaller file size than the raster image.

In some embodiments, the synthetic image is generated based on a text embedding of the input prompt. In some cases, a text embedding may be represented as a vector form in a text embedding space. Vector space provides a framework for representing and manipulating data (in the form of vectors), computing distances between vectors, and transforming input data for complex relationships. The dimensionality of the vector space is determined by the number of features in the feature vector. For example, if each data point has three features (e.g., length, width, and height), the vector space is three-dimensional. In some cases, a joint vector space includes a high-dimensional vector space and a low-dimensional vector space. In some cases, the text embedding is in a low-dimensional vector.

System Architecture

In FIGS. 1, 7-10, and 13, an apparatus and system for image processing include at least one processor, at least one memory storing instructions executable by the at least one processor, a mask component comprising parameters stored in the at least one memory and configured to generate a mask based on an outline image and to generate a preliminary image based on the mask, where the outline image includes an outline of a region, where the mask indicates the region within the outline, and where the preliminary image includes noise in the region indicated by the outline, and an image generation model comprising parameters stored in the at least one memory and configured to generate a synthetic image based on an input prompt, the mask, and the preliminary image, where the input prompt indicates content for the region and the synthetic image depicts the content in the region indicated by the outline.

Some examples of the apparatus and system further include a text encoder configured to encode the input prompt to obtain a text embedding, where the synthetic image is generated based on the text embedding. Some examples of the apparatus and system further include a vectorization component configured to generate a vectorized image based on the synthetic image. In some aspects, the image generation model includes a diffusion model.

Figure 7:
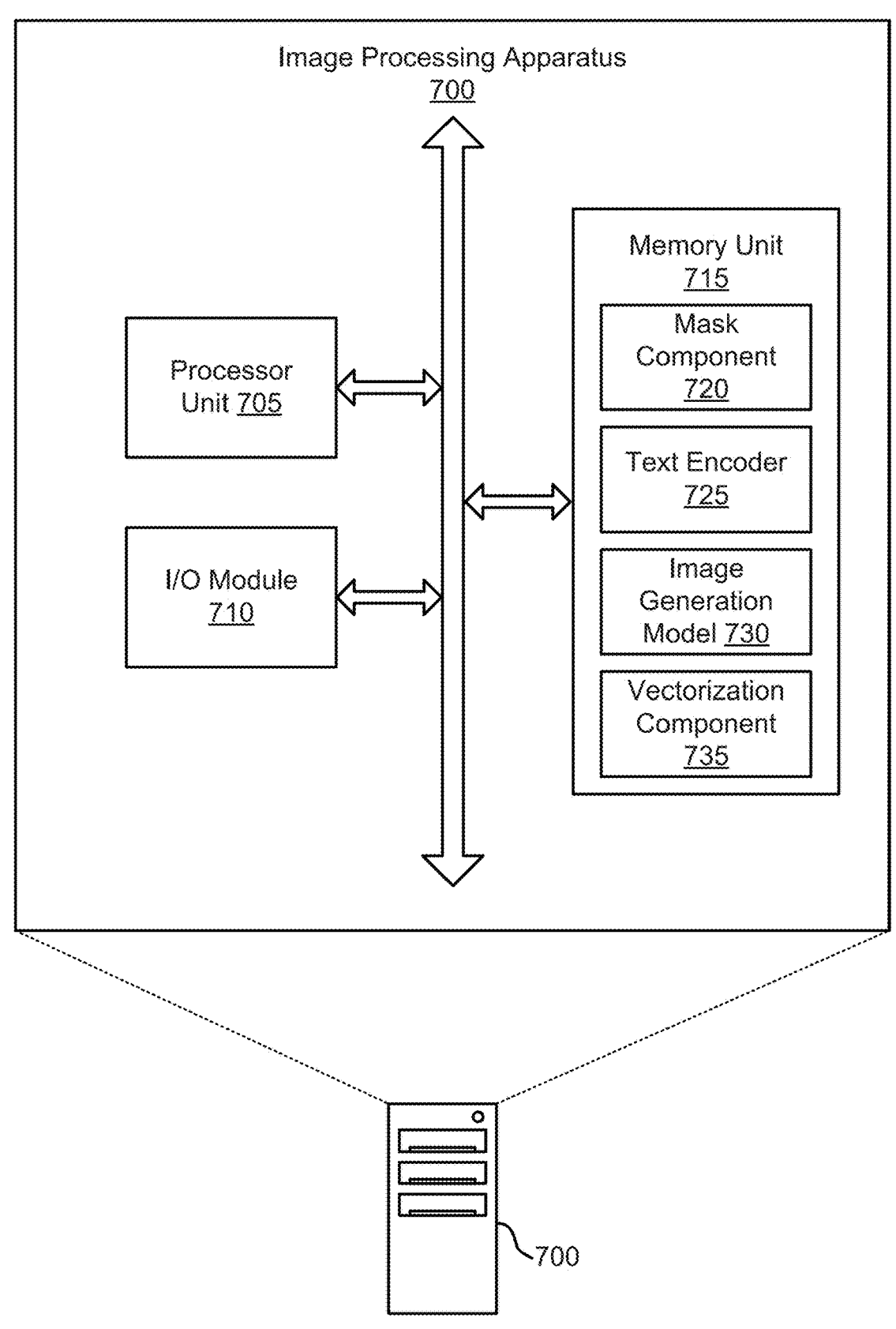
FIG. 7 shows an example of an image processing apparatus according to aspects of the present disclosure.

FIG. 7 shows an example of an image processing apparatus 700 according to aspects of the present disclosure. The example shown includes image processing apparatus 700, processor unit 705, I/O module 710, and memory unit 715. In one aspect, memory unit 715 includes mask component 720, text encoder 725, image generation model 730, and vectorization component 735.

According to some embodiments of the present disclosure, image processing apparatus 700 includes a computer-implemented artificial neural network (ANN). An ANN is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted. Image processing apparatus 700 is an example of, or includes aspects of, the corresponding element described with reference to FIG. 1.

Processor unit 705 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 705 is configured to operate a memory array using a memory controller. In other cases, a memory controller is integrated into the processor. In some cases, processor unit 705 is configured to execute computer-readable instructions stored in a memory to perform various functions. In some embodiments, processor unit 705 includes special-purpose components for modem processing, baseband processing, digital signal processing, or transmission processing. Processor unit 705 is an example of, or includes aspects of, the processor described with reference to FIG. 13.

I/O module 710 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 710 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna. I/O module 710 is an example of, or includes aspects of, the I/O interface described with reference to FIG. 13.

Examples of memory unit 715 include random access memory (RAM), read-only memory (ROM), or a hard disk. Examples of memory unit 715 include solid-state memory and a hard disk drive. In some examples, memory unit 715 is used to store computer-readable, computer-executable software including instructions that, when executed, cause a processor to perform various functions described herein.

In some cases, memory unit 715 includes, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 715 store information in the form of a logical state.

according to some aspects, memory unit 715 includes a machine learning model. In one aspect, the machine learning model includes mask component 720, text encoder 725, image generation model 730, and vectorization component 735. Memory unit 715 is an example of, or includes aspects of, the memory subsystem described with reference to FIG. 13.

In some cases, a machine learning model is a computational algorithm, model, or system designed to recognize patterns, make predictions, or perform a specific task (for example, image processing) without being explicitly programmed. According to some aspects, the machine learning model is implemented as software stored in memory unit 715 and executable by processor unit 705, as firmware, as one or more hardware circuits, or as a combination thereof.

According to some embodiments of the present disclosure, the machine learning model includes an ANN, which is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted.

During the training process, the one or more node weights are adjusted to increase the accuracy of the result (e.g., by minimizing a loss function that corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the corresponding inputs. The initial layer is known as the input layer and the last layer is known as the output layer. In some cases, signals traverse certain layers multiple times.

According to some embodiments, the machine learning model includes a computer-implemented convolutional neural network (CNN). CNN is a class of neural networks commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

In one aspect, machine learning model includes machine learning parameters. Machine learning parameters, also known as model parameters or weights, are variables that provide behaviors and characteristics of the machine learning model. Machine learning parameters can be learned or estimated from training data and are used to make predictions or perform tasks based on learned patterns and relationships in the data.

Machine learning parameters are adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

According to some embodiments, the machine learning model includes a computer-implemented recurrent neural network (RNN). An RNN is a class of ANN in which connections between nodes form a directed graph along an ordered (e.g., a temporal) sequence. This enables an RNN to model temporally dynamic behavior such as predicting what element should come next in a sequence. Thus, an RNN is suitable for tasks that involve ordered sequences such as text recognition (where words are ordered in a sentence). In some cases, an RNN includes one or more finite impulse recurrent networks (characterized by nodes forming a directed acyclic graph), one or more infinite impulse recurrent networks (characterized by nodes forming a directed cyclic graph), or a combination thereof.

According to some embodiments, the machine learning model includes a transformer (or a transformer model, or a transformer network), where the transformer is a type of neural network model used for natural language processing tasks. A transformer network transforms one sequence into another sequence using an encoder and a decoder. The encoder and decoder include modules that can be stacked on top of each other multiple times. The modules comprise multi-head attention and feed-forward layers. The inputs and outputs (target sentences) are first embedded into an n-dimensional space. Positional encoding of the different words (e.g., give each word/part in a sequence a relative position since the sequence depends on the order of its elements) is added to the embedded representation (n-dimensional vector) of each word. In some examples, a transformer network includes an attention mechanism, where the attention looks at an input sequence and decides at each step which other parts of the sequence are important. The attention mechanism involves a query, keys, and values denoted by Q, K, and V, respectively. Q is a matrix that contains the query (vector representation of one word in the sequence), K are the keys (vector representations of the words in the sequence) and V are the values, which are again the vector representations of the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights a.

In the machine learning field, an attention mechanism (e.g., implemented in one or more ANNs) is a method of placing differing levels of importance on different elements of an input. Calculating attention may involve three basic steps. First, a similarity between the query and key vectors obtained from the input is computed to generate attention weights. Similarity functions used for this process can include the dot product, splice, detector, and the like. Next, a softmax function is used to normalize the attention weights. Finally, the attention weights are weighed together with the corresponding values. In the context of an attention network, the key and value are vectors or matrices that are used to represent the input data. The key is used to determine which parts of the input the attention mechanism should focus on, while the value is used to represent the actual data being processed.

An attention mechanism is a key component in some ANN architectures, particularly ANNs employed in natural language processing (NLP) and sequence-to-sequence tasks, that allows an ANN to focus on different parts of an input sequence when making predictions or generating output. Some sequence models (such as RNNs) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering the relevance of each input element with respect to the current state of the ANN.

The term "self-attention" refers to a machine learning model in which representations of the input interact with each other to determine attention weights for the input. Self-attention can be distinguished from other attention models because the attention weights are determined at least in part by the input itself.

According to some aspects, mask component 720 is implemented as software stored in memory unit 715 and executable by processor unit 705, as firmware, as one or more hardware circuits, or as a combination thereof. According to some aspects, mask component 720 generates a mask based on the outline image, where the mask indicates the region within the outline. In some examples, mask component 720 generates a preliminary image based on the mask, where the preliminary image includes noise in the region indicated by the outline. In some examples, mask component 720 labels each pixel of the mask based on whether the pixel is located within the outline. In some examples, mask component 720 adds noise to the region within the outline.

According to some aspects, mask component 720 comprises parameters stored in the at least one memory and configured to generate a mask based on an outline image and to generate a preliminary image based on the mask, where the outline image includes an outline of a region, where the mask indicates the region within the outline, and where the preliminary image includes noise in the region indicated by the outline. Mask component 720 is an example of, or includes aspects of, the corresponding element described with reference to FIG. 8.

According to some aspects, text encoder 725 is implemented as software stored in memory unit 715 and executable by processor unit 705, as firmware, as one or more hardware circuits, or as a combination thereof. According to some aspects, text encoder 725 encodes the input prompt to obtain a text embedding, where the synthetic image is generated based on the text embedding. According to some aspects, text encoder 725 is configured to encode the input prompt to obtain a text embedding, where the synthetic image is generated based on the text embedding. Text encoder 725 is an example of, or includes aspects of, the corresponding element described with reference to FIGS. 8 and 9.

According to some aspects, image generation model 730 is implemented as software stored in memory unit 715 and executable by processor unit 705, as firmware, as one or more hardware circuits, or as a combination thereof. According to some aspects, image generation model 730 obtains an outline image and an input prompt, where the outline image includes an outline of a region and the input prompt indicates content for the region. In some examples, image generation model 730 generates a synthetic image based on the input prompt, the mask, and the preliminary image, where the synthetic image depicts the content in the region indicated by the outline.

According to some aspects, image generation model 730 adds additional noise to the preliminary image to obtain a noise input. In some examples, image generation model 730 denoises the noise input based on the preliminary image to generate the synthetic image. In some examples, image generation model 730 obtains an outline strength parameter. In some examples, image generation model 730 performs a number of diffusion steps based on the outline strength parameter. In some examples, image generation model 730 obtains a reference style, where the synthetic image is generated based on the reference style.

According to some aspects, image generation model 730 comprises parameters stored in the at least one memory and configured to generate a synthetic image based on an input prompt, the mask, and the preliminary image, where the input prompt indicates content for the region and the synthetic image depicts the content in the region indicated by the outline. In some aspects, the image generation model 730 includes a diffusion model. Image generation model 730 is an example of, or includes aspects of, the corresponding element described with reference to FIG. 8.

According to some aspects, vectorization component 735 is implemented as software stored in memory unit 715 and executable by processor unit 705, as firmware, as one or more hardware circuits, or as a combination thereof. According to some aspects, vectorization component 735 generates a vectorized image based on the synthetic image. In some examples, vectorization component 735 removes a background region of the vectorized image. According to some aspects, vectorization component 735 is configured to generate a vectorized image based on the synthetic image. Vectorization component 735 is an example of, or includes aspects of, the corresponding element described with reference to FIG. 8.

Figure 8:
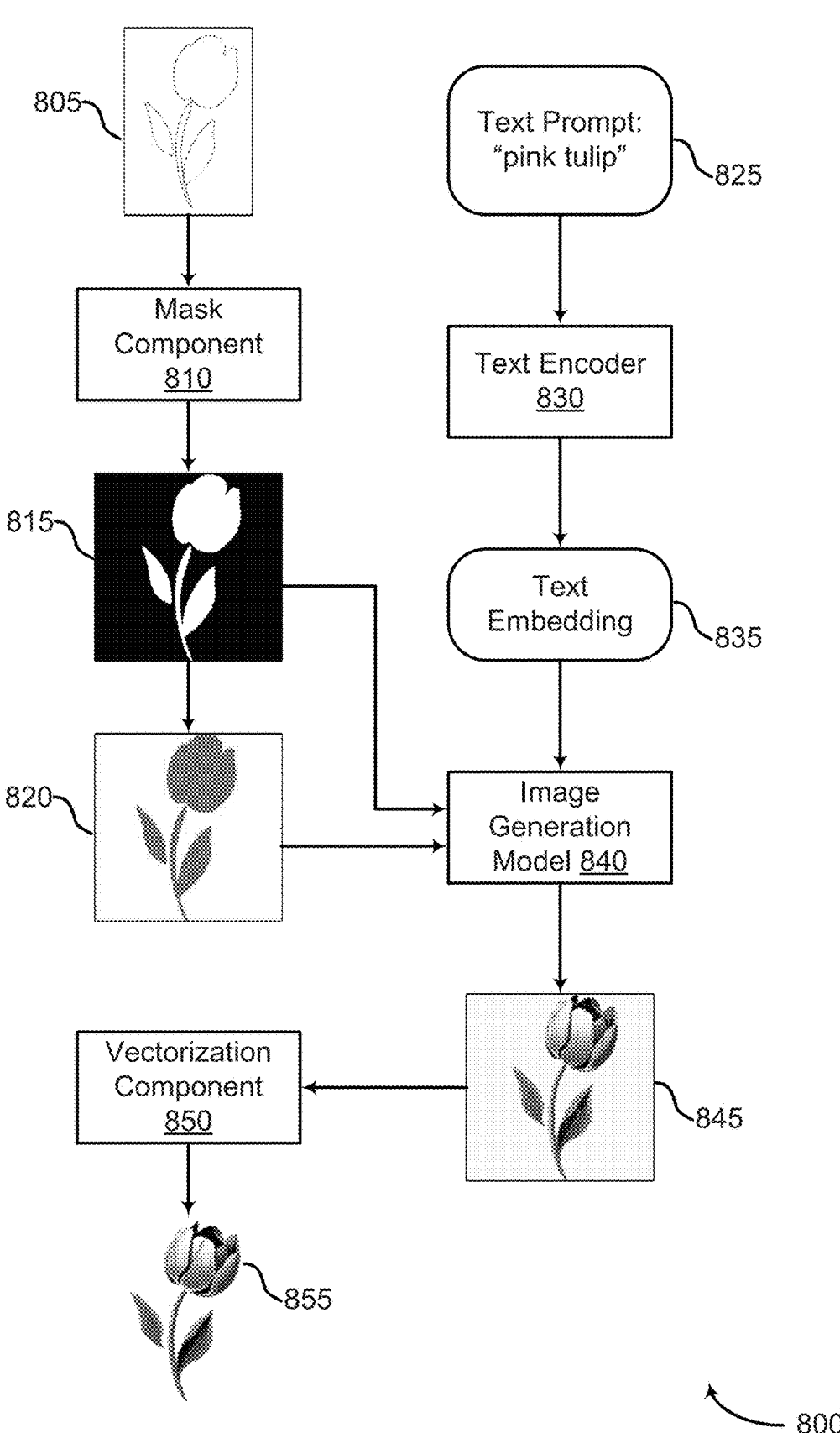
FIG. 8 shows an example of a vector image generation model according to aspects of the present disclosure.

FIG. 8 shows an example of a vector image generation model according to aspects of the present disclosure. The example shown includes machine learning model 800, outline 805, mask component 810, mask 815, preliminary image 820, text prompt 825, text encoder 830, text embedding 835, image generation model 840, synthetic image 845, vectorization component 850, and vectorized image 855. In some aspects, machine learning model 800 includes mask component 810, text encoder 830, image generation model 840, and vectorization component 850.

According to some embodiments, machine learning model 800 takes outline 805 and text prompt 825 to generate vectorized image 855. For example, mask component 810 receives outline 805 to generate mask 815. According to some embodiments, mask component 810 is configured to generate mask 815 (e.g., a binary mask) based on outline 805 provided by a user (e.g., the user described with reference to FIG. 8). In some cases, mask 815 includes an enclosed region for the content to be generated and a remaining region for the background of the outline without content generation. In one aspect, mask 815 is colored in a binary format including 0s and 1s. The binary representation includes the spatial information of the region in the outline with Is and the remaining region for the background (e.g., a background region) of the outline with 0s. The mask 815 is used as input during the image generation process.

In some cases, outline 805 may be normalized to a predetermined dimension. For example, outline 805 may have a width w and a height h. The mask component 810 scales the user-provided outline to a 1024-dimensional representation while maintaining the aspect ratio. Then, the mask component 810 generates a 2D array with a size of 1024×1024 and initialize the 2D array with 0s. The mask component 810 positions the scaled outline at the center of the 2D array. Then, the mask component 810 fills each pixel of the 2D array within the outlined region with 1s and the remaining region with 0s. The mask component 810 generates a mask (e.g., a black-and-white mask) based on the filled 2D array.

In some embodiments, mask component 810 is configured to generate preliminary image 820 (sometimes referred to as the initial image) based on mask 815. In some cases, for example, the preliminary image 820 is used as an initiation point for a subsequent image generation process. For example, mask component 810 fills the background region (e.g., black-colored region) of the mask with a white color and the region within the outline of mask 815 with random noise. The preliminary image 820 can be generated as:

$$I = M * R + (1 - M) * 255 \qquad (1)$$

where I represents the preliminary image 820, M represents the binary mask or mask 815, R represents a noise image having random noise, and 255 represents the white color. In one aspect, the preliminary image 820, generated based on the user-provided outline, specifies the boundaries of the region within the outline for initiating the image generation process. The preliminary image 820 is used as an initiation point for the image generation model.

In some embodiments, text prompt 825 is provided to text encoder 830 to generate text embedding 835. For example, text prompt 825 states "pink tulip". In some cases, text encoder 830 includes a transformer model or a type of algorithm that converts text into a numerical representation such as a vector (e.g., an embedding). The vector can be processed by a machine learning model. In some cases, text encoder 830 is used in natural language processing (NLP) tasks as text encoder 830 transforms raw text data into a format that can be utilized by algorithms for tasks such as classification, translation, sentiment analysis, etc. In one aspect, text embedding 835 includes information about text prompt 825 and is encoded in a vector space.

According to some embodiments, image generation model 840 is configured to generate synthetic image 845 based on the preliminary image 820, text embedding 835, and mask 815. In some cases, image generation model 840 is configured to fill pixels within the region indicated by the outline with vector-like contents described by text prompt 825. In some cases, image generation model 840 includes a diffusion model. In some cases, the image generation process includes a text-to-image synthesis, style conditioning, mask-guided denoising process, and parameter fine-tuning. The diffusion model is an example of, or includes aspects of, the corresponding element described with reference to FIG. 9.

In the field of image synthesis, image generation model 840 is conditioned based on a text prompt 825 to generate the synthetic image 845. For example, text prompt 825 is used to guide the denoising process and control the content generation to align with text prompt 825. In some cases, for example, text encoder 830 or a language generation model is used to capture and interpret the user intention embedded in the text prompt 825 to generate a text embedding 835. The text embedding 835 is used to guide the denoising process of the image generation model 840.

In some embodiments, the image generation process is conditioned based on a style to generate vector-like contents. In an embodiment, a style prior model is used to encode a style input (e.g., the style input described with reference to FIG. 5) to generate an image embedding. The image embedding is used to guide the denoising process of the image generation model 840. In some cases, the style prior model has fewer parameters than the image generation model 840. In some cases, a user is able to control an amount of the style conditioning. For example, a style strength parameter is used to adjust or modify the degree of style to be incorporated into the image generation process.

According to some embodiments, vectorization component 850 is configured to take synthetic image 845 to generate vectorized image 855. For example, vectorization component 850 converts the raster-based image to scalable vector graphics (SVG) while preserving the fine details of the content in the synthetic image 845. In some embodiments, the vectorization component 850 removes the background pixels of the vectorized image 855. For example, the region corresponding to the 0s in the mask is removed from the vectorized image 855. Accordingly, the vectorization component 850 generates a vector graphics object.

Machine learning model 800 is an example of, or includes aspects of, the corresponding element described with reference to FIGS. 3-5. Outline 805 is an example of, or includes aspects of, the corresponding element described with reference to FIGS. 3-5. Mask component 810 is an example of, or includes aspects of, the corresponding element described with reference to FIG. 7.

Mask 815 is an example of, or includes aspects of, the corresponding element described with reference to FIG. 12. Preliminary image 820 is an example of, or includes aspects of, the corresponding element described with reference to FIG. 12. Text prompt 825 is an example of, or includes aspects of, the corresponding element described with reference to FIGS. 3-5, and 9. Text encoder 830 is an example of, or includes aspects of, the corresponding element described with reference to FIGS. 7 and 9.

Image generation model 840 is an example of, or includes aspects of, the corresponding element described with reference to FIG. 7. Synthetic image 845 is an example of, or includes aspects of, the corresponding element described with reference to FIG. 12. Vectorization component 850 is an example of, or includes aspects of, the corresponding element described with reference to FIG. 7. Vectorized image 855 is an example of, or includes aspects of, the corresponding element described with reference to FIGS. 3-5.

Figure 9:
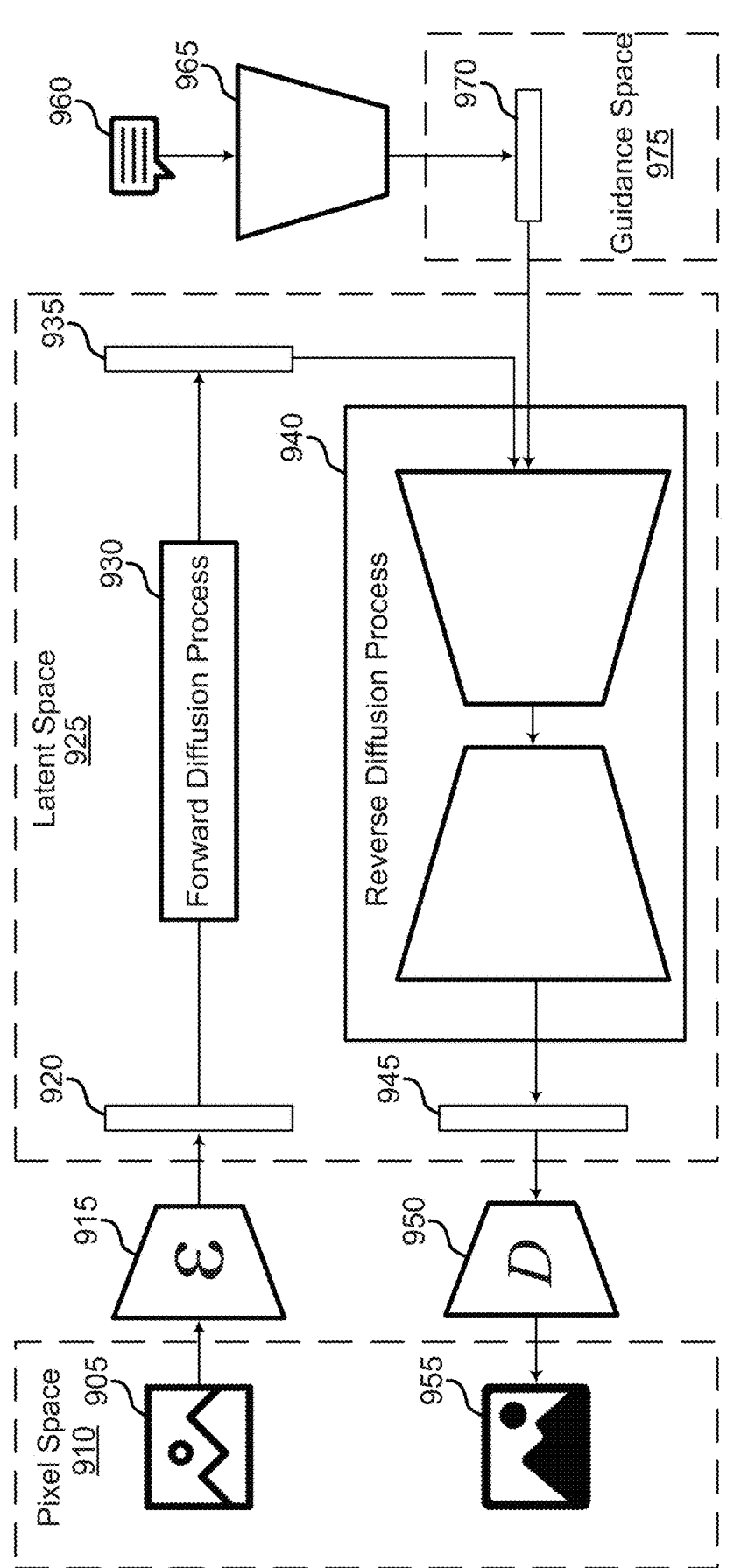
FIG. 9 shows an example of an image generation model according to aspects of the present disclosure.

FIG. 9 shows an example of an image generation model according to aspects of the present disclosure. The example shown includes diffusion model 900, original image 905, pixel space 910, image encoder 915, original image feature 920, latent space 925, forward diffusion process 930, noisy feature 935, reverse diffusion process 940, denoised image feature 945, image decoder 950, output image 955, text prompt 960, text encoder 965, guidance feature 970, and guidance space 975. In some examples, diffusion model 900 describes the operation and architecture of the image generation model 730 described with reference to FIG. 7.

Diffusion models are a class of generative neural networks that can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance, color guidance, style guidance, and image guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (e.g., latent diffusion).

Diffusion models work by iteratively adding noise to the data during a forward process and then learning to recover the data by denoising the data during a reverse process. For example, during training, diffusion model 900 may take an original image 905 in a pixel space 910 as input and apply an image encoder 915 to convert original image 905 into original image feature 920 in a latent space 925. Then, a forward diffusion process 930 gradually adds noise to the original image feature 920 to obtain noisy feature 935 (also in latent space 925) at various noise levels.

Next, a reverse diffusion process 940 (e.g., a U-Net ANN) gradually removes the noise from the noisy feature 935 at the various noise levels to obtain the denoised image feature 945 in latent space 925. In some examples, denoised image feature 945 is compared to the original image feature 920 at each of the various noise levels, and parameters of the reverse diffusion process 940 of the diffusion model are updated based on the comparison. Finally, an image decoder 950 decodes the denoised image feature 945 to obtain an output image 955 in pixel space 910. In some cases, an output image 955 is created at each of the various noise levels. The output image 955 can be compared to the original image 905 to train the reverse diffusion process 940. In some cases, output image 955 refers to the synthetic image (e.g., described with reference to FIGS. 8 and 12).

In some cases, image encoder 915 and image decoder 950 are pre-trained prior to training the reverse diffusion process 940. In some examples, image encoder 915 and image decoder 950 are trained jointly, or the image encoder 915 and image decoder 950 are fine-tuned jointly with the reverse diffusion process 940.

The reverse diffusion process 940 can also be guided based on a text prompt 960, or another guidance prompt, such as an image, a layout, a style, a color, a segmentation map, etc. The text prompt 960 can be encoded using a text encoder 965 (e.g., a multimodal encoder) to obtain guidance feature 970 in guidance space 975. The guidance feature 970 can be combined with the noisy feature 935 at one or more layers of the reverse diffusion process 940 to ensure that the output image 955 includes content described by the text prompt 960. For example, guidance feature 970 can be combined with the noisy feature 935 using a cross-attention block within the reverse diffusion process 940.

Cross-attention, also known as multi-head attention, is an extension of the attention mechanism used in some ANNs, for example, for NLP tasks. In some cases, cross-attention attends to multiple parts of an input sequence simultaneously, capturing interactions and dependencies between different elements. In cross-attention, there are two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring the similarity between each query representation and the key representations, where a higher similarity indicates that more attention is given to a key element. An attention score indicates the importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences, allowing the machine learning model to understand the context and generate more accurate and contextually relevant outputs.

In some examples, diffusion models are based on a neural network architecture known as a U-Net. The U-Net takes input features having an initial resolution and an initial number of channels, and processes the input features using an initial neural network layer (e.g., a convolutional network layer) to generate intermediate features. The intermediate features are then down-sampled using a down-sampling layer such that down-sampled features have a resolution less than the initial resolution and a number of channels greater than the initial number of channels.

This process is repeated multiple times, and then the process is reversed. For example, the down-sampled features are up-sampled using the up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels.

In some cases, a U-Net takes additional input features to produce conditionally generated output. For example, the additional input features may include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt (e.g., text prompt 960) describing content to be included in a generated image. In some examples, guidance can be provided in a form other than text, such as via an image, a sketch, a color, a style, or a layout. The system converts text prompt 960 (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the diffusion model 900 generates an image based on the noise map and the conditional guidance vector.

A diffusion process can include both a forward diffusion process 930 for adding noise to an image (e.g., original image 905) or features (e.g., original image feature 920) in a latent space 925 and a reverse diffusion process 940 for denoising the images (or features) to obtain a denoised image (e.g., output image 955). The forward diffusion process 930 can be represented as $q(x_t|x_{t-1})$, and the reverse diffusion process 940 can be represented as $p(x_{t-1}|x_t)$. Further detail on the diffusion process is described with reference to FIG. 11.

A diffusion model 900 may be trained using both a forward diffusion process 930 and a reverse diffusion process 940. In one example, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like.

The system then adds noise to a training image using a forward diffusion process 930 in N stages. In some cases, the forward diffusion process 930 is a fixed process where Gaussian noise is successively added to an image. In latent diffusion models, the Gaussian noise may be successively added to features (e.g., original image feature 920) in a latent space 925.

At each stage n, starting with stage N, a reverse diffusion process 940 is used to predict the image or image features at stage n–1. For example, the reverse diffusion process 940 can predict the noise that was added by the forward diffusion process 930, and the predicted noise can be removed from the image to obtain the predicted image. In some cases, an original image 905 is predicted at each stage of the training process.

The training component (e.g., training component described with reference to FIG. 6) compares predicted image (or image features) at stage n–1 to an actual image (or image features), such as the image at stage n–1 or the original input image. For example, given observed data x, the diffusion model 900 may be trained to minimize the variational upper bound of the negative log-likelihood $-\log p_\theta(x)$ of the training data. The training component then updates parameters of the diffusion model 900 based on the comparison. For example, parameters of a U-Net may be updated using gradient descent. Time-dependent parameters of the Gaussian transitions can also be learned.

Diffusion model 900 is an example of, or includes aspects of, the image generation model described with reference to FIGS. 7 and 8. Original image 905 is an example of, or includes aspects of, the corresponding element described with reference to FIG. 11. Forward diffusion process 930 is an example of, or includes aspects of, the corresponding element described with reference to FIG. 11.

Reverse diffusion process 940 is an example of, or includes aspects of, the corresponding element described with reference to FIG. 11. Text prompt 960 is an example of, or includes aspects of, the corresponding element described with reference to FIGS. 3-5, and 8. Text encoder 965 is an example of, or includes aspects of, the corresponding element described with reference to FIGS. 7 and 8.

Figure 10:
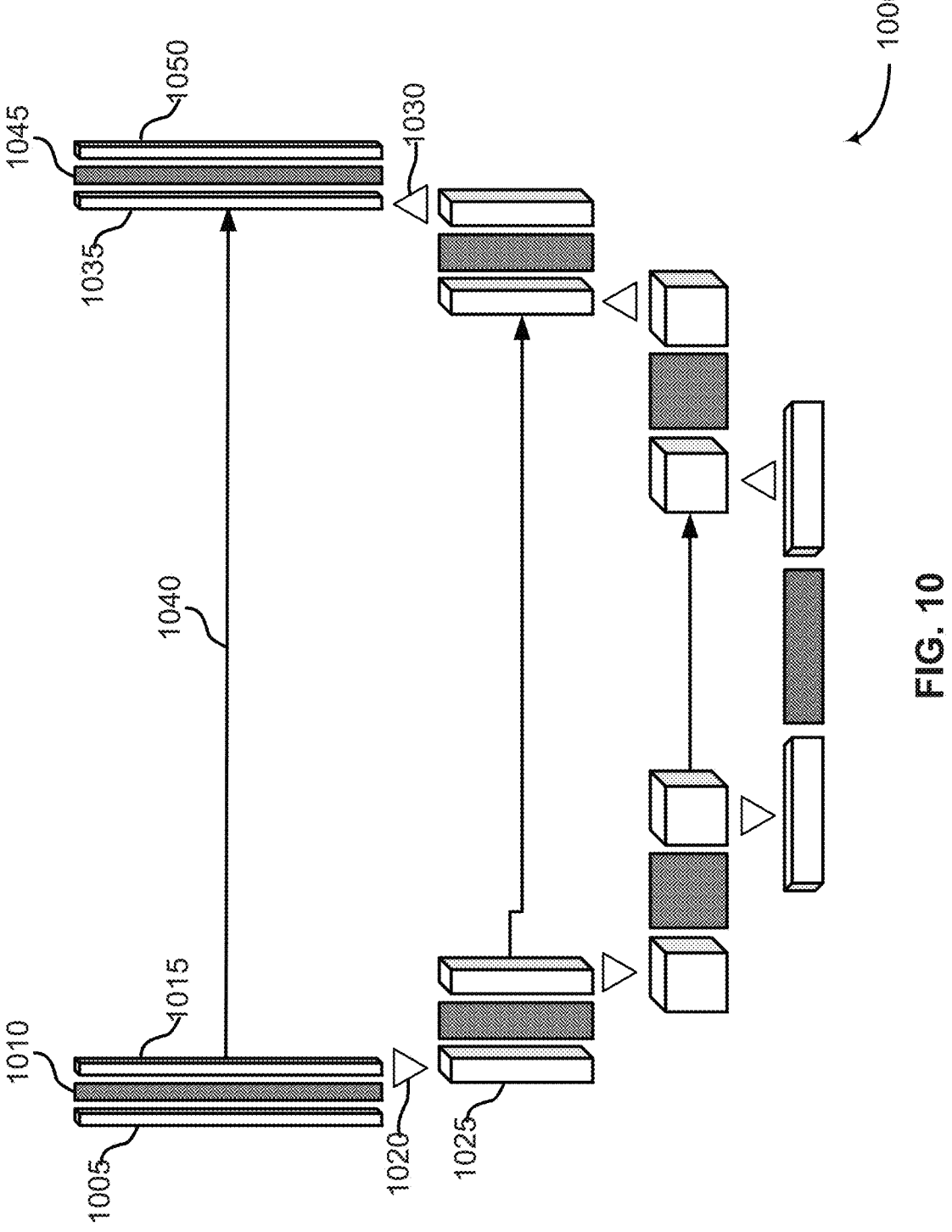
FIG. 10 shows an example of a U-Net architecture according to aspects of the present disclosure.

FIG. 10 shows an example of a U-Net 1000 architecture according to aspects of the present disclosure. The example shown includes U-Net 1000, input feature 1005, initial neural network layer 1010, intermediate feature 1015, down-sampling layer 1020, down-sampled feature 1025, up-sampling process 1030, up-sampled feature 1035, skip connection 1040, final neural network layer 1045, and output feature 1050.

In some examples, U-Net 1000 is an example of the component that performs the reverse diffusion process 940 of diffusion model 900 described with reference to FIG. 9 and includes architectural elements of the image generation model 730 described with reference to FIG. 7. The U-Net 1000 depicted in FIG. 10 is an example of, or includes aspects of, the architecture used within the reverse diffusion process described with reference to FIG. 9.

In some examples, diffusion models are based on a neural network architecture known as a U-Net. The U-Net 1000 takes input feature 1005 having an initial resolution and an initial number of channels, and processes the input feature 1005 using an initial neural network layer 1010 (e.g., a convolutional network layer) to produce intermediate feature 1015. The intermediate feature 1015 is then down-sampled using a down-sampling layer 1020 such that the down-sampled feature 1025 has a resolution less than the initial resolution and a number of channels greater than the initial number of channels.

This process is repeated multiple times, and then the process is reversed. For example, the down-sampled feature 1025 is up-sampled using up-sampling process 1030 to obtain up-sampled feature 1035. The up-sampled feature 1035 can be combined with intermediate feature 1015 having the same resolution and number of channels via a skip connection 1040. These inputs are processed using a final neural network layer 1045 to produce output feature 1050. In some cases, the output feature 1050 has the same resolution as the initial resolution and the same number of channels as the initial number of channels.

In some cases, U-Net 1000 takes an additional input feature to produce conditionally generated output. For example, the additional input feature could include a vector representation of an input prompt. The additional input feature can be combined with the intermediate feature 1015 within the neural network at one or more layers. For example, a cross-attention module can be used to combine the additional input features and the intermediate feature 1015.

Mask-Guided Diffusion Process

Figure 11:
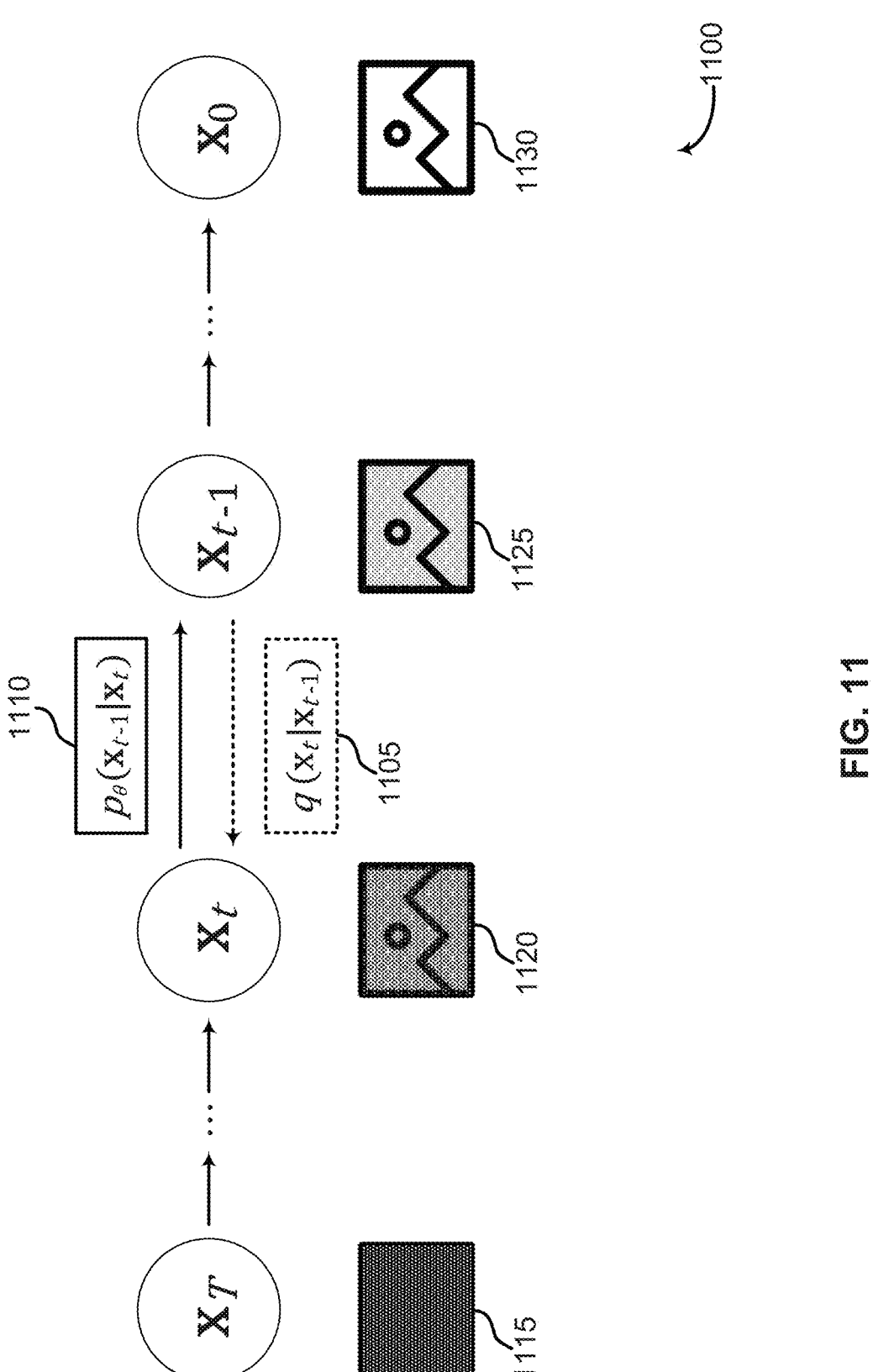
FIG. 11 shows an example of a diffusion process of a diffusion model according to aspects of the present disclosure.

In FIGS. 11-12, a method, apparatus, non-transitory computer readable medium, and system for image processing include obtaining an outline image and an input prompt, generating a mask based on the outline image, generating a preliminary image based on the mask, adding additional noise to the preliminary image to obtain a noise input, generating a synthetic image based on the input prompt, the mask, the preliminary image, and the noise input, and generating a vectorized image based on the synthetic image.

FIG. 11 shows an example of a diffusion process 1100 of a diffusion model according to aspects of the present disclosure. The example shown includes diffusion process 1100, forward diffusion process 1105, reverse diffusion process 1110, noisy image 1115, first intermediate image 1120, second intermediate image 1125, and original image 1130.

Diffusion process 1100 can include forward diffusion process 1105 for adding noise to original image 1130 (e.g., original image 905 described with reference to FIG. 9) or features (e.g., original image feature 920 described with reference to FIG. 9) in a latent space. In some aspects, diffusion process 1100 includes reverse diffusion process 1110 for denoising the noisy image 1115 (or image features) to obtain a denoised image (or original image 1130). The forward diffusion process 1105 can be represented as $q(x_t|x_{t-1})$, and the reverse diffusion process 1110 can be represented as pe $(x_{t-1}|x_t)$. In some cases, the forward diffusion process 1105 is used during training to generate images with successively greater noise, and a neural network is trained to perform the reverse diffusion process 1110 (e.g., to successively remove the noise).

In an example forward diffusion process 1105 for a latent diffusion model (e.g., diffusion model 900 described with reference to FIG. 9), the diffusion model maps an observed variable $x_0$ (either in a pixel space or a latent space) to obtain intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse diffusion process 1110. During the reverse diffusion process 1110, the diffusion model begins with noisy data $x_T$, such as a noisy image 1115 and denoises the data to obtain the pe $(x_{t-1}|x_t)$. At each step t−1, the reverse diffusion process 1110 takes $x_t$, such as the first intermediate image 1120, and t as input. Here, t represents a step in the sequence of transitions associated with different noise levels, The reverse diffusion process 1110 outputs $x_{t-1}$, such as the second intermediate image 1125, iteratively until $x_T$ is reverted back to $x_0$, the original image 1130. The reverse diffusion process 1110 can be represented as:

$$p_\theta(x_{t-1} \mid x_t) := N\left(x_{t-1}; \mu_\theta(x_t, t), \sum_\theta(x_t, t)\right). \qquad (2)$$

The joint probability of a sequence of samples in the Markov chain can be written as a product of conditionals and the marginal probability:

$$x_T: \ p_\theta(x_{0:T}) := p(x_T)\prod_{t=1}^{T} p_\theta(x_{t-1} \mid x_t), \qquad (3)$$

where $p(x_T)=N (x_T; 0, 1)$ is the pure noise distribution as the reverse diffusion process 1110 takes the outcome of the forward diffusion process 1105, a sample of pure noise, as input and $$\prod_{t=1}^{T} p_\theta(x_{t-1} \mid x_t)$$

represents a sequence of Gaussian transitions corresponding to a sequence of addition of Gaussian noise to the sample.

At interference time, observed data $x_0$ in a pixel space can be mapped into a latent space as input and a generated data % is mapped back into the pixel space from the latent space as output. In some examples, $x_0$ represents an original input image with low image quality, latent variables $x_1, \ldots, x_T$ represent noisy images, and % represents the generated image with high image quality.

Forward diffusion process 1105 is an example of, or includes aspects of, the corresponding element described with reference to FIG. 9. Reverse diffusion process 1110 is an example of, or includes aspects of, the corresponding element described with reference to FIG. 9. Original image 1130 is an example of, or includes aspects of, the corresponding element described with reference to FIG. 9.

FIG. 12 shows an example of a mask-guided diffusion process according to aspects of the present disclosure. The example shown includes guided diffusion process 1200, preliminary image 1205, intermediate noisy latent 1210, final noisy latent 1215, denoised latent 1220, mask 1225, guided reverse diffusion process 1230, guided denoised latent 1235, and synthetic image 1240.

Referring to FIG. 12, preliminary image 1205 is denoised to synthetic image 1240 through guided diffusion process 1200. For example, during the guided diffusion process 1200, noise is added to preliminary image 1205 to obtain intermediate noisy latent 1210. Then, additional noise is progressively added to intermediate noisy latent 1210 to generate the final noisy latent 1215. The amount of additional noise to add or the amount of diffusion steps is based on an encoding ratio r. For example, the higher the encoding ratio, the more diffusion steps are to be performed, and the higher the image quality of synthetic image 1240.

Then, noise is iteratively removed from the final noisy latent 1215 to obtain denoised latent 1220. In some embodiments, during the guided reverse diffusion process 1230, the image generation model takes denoised latent 1220, mask 1225, and intermediate noisy latent 1210 at the corresponding timestep to perform denoising to obtain guided denoised latent 1235. Then, during the next denoising timestep, the guided denoised latent 1235, the mask 1225, and a second intermediate noisy latent are used to generate the synthetic image 1240. In some cases, the second intermediate noisy latent is generated at a timestep t, and intermediate noisy latent 1210 is generated at a timestep t+1.

According to some embodiments, the image generation model is configured to generate content within the region indicated by the outline and minimize generation to the background region of the outline during the denoising process (sometimes referred to as the guided reverse diffusion process 1230). In some cases, the image generation model substitutes pixel values in the background region with corresponding noisy latent (e.g., intermediate noisy latent

1210) at each denoising timestep t of the denoising process. The substitution maps back to the original pixels at the end of the denoising process (e.g., at timestep 0), which reduces modification to the background region. The mask-guided diffusion process can be expressed as:

$$y_t' = M * y_t + (1 - M) * x_t \qquad (4)$$

where $$y_t'$$

is the final denoised latent at timestep t, M is the mask 1225, $y_t$ is the denoised latent at timestep t, and $x_t$ is the noisy latent at timestep t. In some cases, the noisy latent $x_t$ is obtained by introducing noise to an original image $x_0$. In some cases, the original image $x_0$ is the preliminary image 1205.

In some embodiments, the number of diffusion steps for the image generation model is determined based on an encoding ratio r (sometimes referred to as the outline strength parameter). For example, the outline strength parameter determines the intensity of image generation within the region indicated by the outline. By adjusting the outline strength parameter, the image generation model fine-tunes the synthetic image to align with the fidelity of the outline. Accordingly, the image generation model maintains a harmonious balance between the denoising and faithfulness to the outline.

According to some embodiments, parameters of the image generation model are fine-tuned to adjust the overall aesthetics, vector style, and fidelity to the outline of the synthetic image. For example, the parameters include prompt engineering, style prompt, style strength, avoid prompt, outline strength, aesthetic score, sharpness guidance, diffusion steps, skip type, classifier-free guidance scale, and masking interval. In prompt engineering, a user-provided text prompt is modified to enhance the quality of the synthetic image. For example, an augmented prompt is generated based on the text prompt. In some cases, the augmented prompt includes one or more additional texts such as a vector-looking design. In style prompt, the text prompt is used to generate a style embedding. The synthetic image is generated based on the style embedding. In style strength, a control parameter is used to guide the extent of style incorporation. In an avoid prompt, a negative text prompt is used to guide the diffusion model away from generating undesired elements in the synthetic image. For example, the avoid prompt may include one or more additional texts such as photorealism.

In outline strength, an outline strength parameter sets the start value for the scheduling interval (e.g., the noise level) to initiate the denoising process. For example, a higher outline strength parameter value indicates an increased fidelity to the outline. In aesthetic score, an aesthetic score is used to fine-tune the visual intensity of the synthetic image and to enhance the overall visual appearance of the synthetic image. In sharpness guidance, a parameter is adjusted to control the sharpness in the synthetic image. For example, the level of detail and clarity in the synthetic image is adjusted, thus, enhancing the visual quality of the synthetic image. In diffusion steps, a parameter controls the number of timesteps to execute during the inference time. In skip type, some diffusion timesteps are skipped to control the pacing and efficiency of the image generation model. In classifier-free guidance scale, a parameter is used to control how closely the synthetic image aligns with the text prompt provided by the user. In the masking interval, a parameter is used to control the interval to use the mask as conditioning in the denoising process.

Preliminary image 1205 is an example of, or includes aspects of, the corresponding element described with reference to FIG. 8. Mask 1225 is an example of, or includes aspects of, the corresponding element described with reference to FIG. 8. Synthetic image 1240 is an example of, or includes aspects of, the corresponding element described with reference to FIG. 8.

FIG. 13 shows an example of a computing device 1300 according to aspects of the present disclosure. The example shown includes computing device 1300, processor 1305, memory subsystem 1310, communication interface 1315, I/O interface 1320, user interface component 1325, and channel 1330.

In some embodiments, computing device 1300 is an example of, or includes aspects of, the image processing apparatus described with reference to FIGS. 1 and 7. In some embodiments, computing device 1300 includes processor 1305 that can execute instructions stored in memory subsystem 1310 to obtain an outline image and an input prompt, to generate a mask based on the outline image, to generate a preliminary image based on the mask, and to generate a synthetic image based on the input prompt, the mask, and the preliminary image.

According to some embodiments, processor 1305 includes one or more processors. In some cases, processor 1305 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, processor 1305 is configured to operate a memory array using a memory controller. In other cases, a memory controller is integrated into processor 1305. In some cases, processor 1305 is configured to execute computer-readable instructions stored in a memory to perform various functions. In some embodiments, processor 1305 includes special-purpose components for modem processing, baseband processing, digital signal processing, or transmission processing. Processor 1305 is an example of, or includes aspects of, the processor unit described with reference to FIG. 7.

According to some embodiments, memory subsystem 1310 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1310 is an example of, or includes aspects of, the memory unit described with reference to FIG. 7.

According to some embodiments, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1315.

According to some embodiments, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1320 or hardware components controlled by the I/O controller.

According to some embodiments, user interface component 1325 enables a user to interact with computing device 1300. In some cases, user interface component 1325 includes an audio device, such as an external speaker system, an external display device such as a display screen, an input device (e.g., a remote-control device interfaced with a user interface directly or through the I/O controller), or a combination thereof.

The performance of apparatus, systems, and methods of the present disclosure have been evaluated, and results indicate embodiments of the present disclosure have obtained increased performance over existing technology (e.g., conventional image generation models). Example experiments demonstrate that the image processing apparatus based on the present disclosure outperforms conventional image generation models. Details on the example use cases based on embodiments of the present disclosure are described with reference to FIGS. 3-5.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining an outline image and an input prompt, wherein the outline image includes an outline of a region and the input prompt indicates content for the region;
generating a mask based on the outline image, wherein the mask indicates the region within the outline;
generating a preliminary image based on the mask, wherein the preliminary image includes noise in the region indicated by the outline;
generating, using an image generation model, a synthetic image based on the input prompt, the mask, and the preliminary image, wherein the synthetic image depicts the content in the region indicated by the outline; and
generating a vectorized image based on the synthetic image.

2. The method of claim 1, wherein generating the mask comprises:
labeling each pixel of the mask based on whether the pixel is located within the outline.

3. The method of claim 1, wherein generating the preliminary image comprises:

adding noise to the region within the outline.

4. The method of claim 1, wherein generating the synthetic image comprises:

adding additional noise to the preliminary image to obtain a noise input; and denoising the noise input based on the preliminary image to generate the synthetic image.

5. The method of claim 1, wherein generating the synthetic image comprises:

obtaining an outline strength parameter; and performing a number of diffusion steps based on the outline strength parameter.

6. The method of claim 1, wherein generating the synthetic image comprises:

encoding the input prompt to obtain a text embedding, wherein the synthetic image is generated based on the text embedding.

7. The method of claim 1, wherein generating the synthetic image comprises:

obtaining a reference style, wherein the synthetic image is generated based on the reference style.

8. The method of claim 1, wherein:

the synthetic image comprises a vectorizable image.

9. The method of claim 1, further comprising:

removing a background region of the vectorized image based on the mask.

10. A non-transitory computer readable medium storing code for image processing, the code comprising instructions that, when executed by at least one processor, causes the at least one processor to perform operations comprising:

obtaining an outline image and an input prompt, wherein the outline image includes an outline of a region and the input prompt indicates content for the region;

generating a mask based on the outline image, wherein the mask indicates the region within the outline;

generating a preliminary image based on the mask, wherein the preliminary image includes noise in the region indicated by the outline;

generating, using an image generation model, a synthetic image based on the input prompt, the mask, and the preliminary image, wherein the synthetic image depicts the content in the region indicated by the outline; and generating a vectorized image based on the synthetic image.

11. The non-transitory computer readable medium of claim 10, the code further comprising instructions that, when executed by the at least one processor, causes the at least one processor to perform operations comprising:

labeling each pixel of the mask based on whether the pixel is located within an outline of the outline image.

12. The non-transitory computer readable medium of claim 10, wherein generating the preliminary image comprises:

adding noise to a region within an outline of the outline image.

13. The non-transitory computer readable medium of claim 10, the code further comprising instructions that, when executed by the at least one processor, causes the at least one processor to perform operations comprising:

obtaining an outline strength parameter; and performing a number of diffusion steps based on the outline strength parameter.

14. The non-transitory computer readable medium of claim 10, the code further comprising instructions that, when executed by the at least one processor, causes the at least one processor to perform operations comprising:

encoding the input prompt to obtain a text embedding.

15. The non-transitory computer readable medium of claim 10, the code further comprising instructions that, when executed by the at least one processor, causes the at least one processor to perform operations comprising:

denoising the noise input based on the preliminary image to generate the synthetic image.

16. The non-transitory computer readable medium of claim 10, the code further comprising instructions that, when executed by the at least one processor, causes the at least one processor to perform operations comprising:

removing a background region of the vectorized image.

17. A system comprising:

a memory component; and a processing device coupled to the memory component, the processing device configured to perform operations comprising:

obtaining an outline image and an input prompt, wherein the outline image includes an outline of a region and the input prompt indicates content for the region;

generating a mask based on the outline image, wherein the mask indicates the region within the outline;

generating a preliminary image based on the mask, wherein the preliminary image includes noise in the region indicated by the outline;

generating, using an image generation model, a synthetic image based on the input prompt, the mask, and the preliminary image, wherein the synthetic image depicts the content in the region indicated by the outline; and generating a vectorized image based on the synthetic image.

18. The system of claim 17, further comprising:

a text encoder configured to encode the input prompt to obtain a text embedding, wherein the synthetic image is generated based on the text embedding.

19. The system of claim 17, further comprising:

a vectorization component configured to generate the vectorized image based on the synthetic image.

20. The system of claim 17, wherein:

the image generation model includes a diffusion model.

* * * * *